(12) United States Patent
Cho et al.

(10) Patent No.: US 12,001,242 B2
(45) Date of Patent: Jun. 4, 2024

(54) ELECTRONIC DEVICE

(71) Applicant: Samsung Display Co., Ltd., Yongin-si (KR)

(72) Inventors: Hyunjun Cho, Seoul (KR); Kyu Young Kim, Suwon-si (KR); Yong-Kwan Kim, Yongin-si (KR); Hansun Ryou, Seoul (KR); Yonghyuck Lee, Cheonan-si (KR); Hongkwan Lee, Yongin-si (KR); Sohra Han, Cheonan-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/499,286

(22) Filed: Oct. 12, 2021

(65) Prior Publication Data

US 2022/0229469 A1    Jul. 21, 2022

(30) Foreign Application Priority Data

Jan. 21, 2021    (KR) ........................ 10-2021-0008681

(51) Int. Cl.
   *G06F 1/16*        (2006.01)
   *G02B 1/14*        (2015.01)

(52) U.S. Cl.
   CPC ............. *G06F 1/1641* (2013.01); *G02B 1/14* (2015.01); *G06F 1/1652* (2013.01)

(58) Field of Classification Search
   CPC ....... G06F 1/1641; G06F 1/1652; G02B 1/04; G02B 1/14
   See application file for complete search history.

(56) References Cited

U.S. PATENT DOCUMENTS

| | | | |
|---|---|---|---|
| 10,409,332 B2 | 9/2019 | Mizoguchi et al. | |
| 10,727,425 B2* | 7/2020 | Kim | H10K 71/00 |
| 2014/0329048 A1 | 11/2014 | Jung et al. | |
| 2018/0192527 A1* | 7/2018 | Yun | G09F 9/301 |
| 2020/0022267 A1 | 1/2020 | Han et al. | |
| 2020/0389986 A1* | 12/2020 | Tsuchihashi | G06F 1/1616 |
| 2021/0365072 A1* | 11/2021 | Kinoshita | G06F 1/1616 |
| 2022/0137669 A1* | 5/2022 | Horiuchi | G06F 1/1656 |
| | | | 312/223.2 |
| 2022/0149337 A1* | 5/2022 | Horiuchi | G06F 1/1652 |
| 2022/0189349 A1* | 6/2022 | Roh | B32B 15/08 |
| 2022/0243096 A1* | 8/2022 | Kim | B32B 27/38 |
| 2023/0049336 A1* | 2/2023 | Jang | G06F 1/1652 |

FOREIGN PATENT DOCUMENTS

| | | |
|---|---|---|
| KR | 10-2012-0097272 | 9/2012 |
| KR | 10-2014-0077582 | 6/2014 |
| KR | 10-1832301 | 2/2018 |
| KR | 10-2018-0024874 | 3/2018 |
| KR | 10-2020-0006646 | 1/2020 |

* cited by examiner

*Primary Examiner* — Rockshana D Chowdhury
(74) *Attorney, Agent, or Firm* — KILE PARK REED & HOUTTEMAN PLLC

(57) ABSTRACT

An electronic device includes a display module, and a support plate disposed under the display module and comprising reinforced fibers having long axes arranged in parallel to a direction. The electronic device is divided into a folding area foldable with respect to a folding axis extending in the direction, and a non-folding area adjacent to the folding area.

21 Claims, 19 Drawing Sheets

ELECTRONIC DEVICE

CROSS-REFERENCE TO RELATED APPLICATION(S)

This U.S. non-provisional patent application claims priority to and the benefit of Korean Patent Application No. 10-2021-0008681 under 35 U.S.C. § 119, filed in the Korean Intellectual Property Office (KIPO) on Jan. 21, 2021, the entire contents of which are incorporated herein by reference.

BACKGROUND

The disclosure herein relates to an electronic device having flexibility.

Various types of electronic devices are used to provide image information. Recently, display devices including flexible display panels, which are foldable ad bendable, are being developed. Unlike a rigid display device, a flexible display device may be changed in various shapes such as being folded, rolled, or bent so that the flexible display device is portable regardless of the size of a displayed screen.

Such a flexible display device requires a support member to support a display panel without hindering a folding or bending operation, and it is necessary to develop a lightweight support member without deteriorating mechanical properties, thereby improving user convenience.

SUMMARY

The disclosure provides an electronic device including a reinforced fiber composite for a support member to realize a light weight, excellent flexibility, and desirable mechanical properties.

An embodiment of the disclosure provides an electronic device including: a display module; and a support plate disposed under the display module and including reinforced fibers that have long axes parallel to a direction. The electronic device may include a folding area foldable with respect to a folding axis extending in the direction, and a non-folding area adjacent to the folding area.

In an embodiment, the reinforced fibers may include carbon fibers or glass fibers.

In an embodiment, the support plate may include a matrix part, the support plate including a thermoplastic resin, and the reinforced fibers may be dispersed in the matrix part.

In an embodiment, the support plate may include a first sub-support plate and a second sub-support plate, which are laminated in a thickness direction of the electronic device, the first sub-support plate may include first reinforced fibers having long axes perpendicular to the folding axis, and the second sub-support plate may include second reinforced fibers having long axes parallel to the folding axis.

In an embodiment, the support plate may include three or more sub-support plates that are laminated in a thickness direction of the electronic device, and in the sub-support plates that are laminated, each of an uppermost sub-support plate of the three or more sub-support plates that is adjacent to the display module and the lowermost sub-support plate of the three or more sub-support plates that is spaced apart from display module may include the reinforced fibers having long axes parallel to the direction.

In an embodiment, the support plate may include at least one transverse sub-support plate disposed between the uppermost sub-support plate and the lowermost sub-support plate, the at least one transverse sub-support plate including reinforced fibers that have long axes perpendicular to the direction.

In an embodiment, the support plate may include n sub-support plates that are sequentially laminated in a direction of the display module, the n sub-support plates may include a longitudinal sub-support plate and a transverse sub-support plate, which are alternately laminated, the longitudinal sub-support plate may include reinforced fibers having long axes arranged in a first direction parallel to the folding axis, and the transverse sub-support plate may include reinforced fibers having long axes arranged in a second direction perpendicular to the first direction, and each of an n-th sub-support plate adjacent to the display module and a first sub-support plate spaced apart from the display module may be provided as the longitudinal sub-support plate, where the n is an odd number of 3 or more.

In an embodiment, the display module may include a folding display part corresponding to the folding area, and a first non-folding display part and a second non-folding display part corresponding to the non-folding area and spaced apart from each other with the folding display part disposed between the first and second non-folding display parts, and the support plate may include: a first plate overlapping the first non-folding display part; and a second plate overlapping the second non-folding display parts and spaced apart from the first plate.

In an embodiment, the support plate may include a plate folding part corresponding to the folding area, and a plate non-folding part corresponding to the non-folding area, and a plurality of openings may be formed in the plate folding part.

In an embodiment, a width of each of the plurality of openings in a direction parallel to the direction may be greater than a width of each of the plurality of openings in another direction perpendicular to the direction.

In an embodiment, the electronic device may further include a support member disposed under the support plate, the support member including at least one of a support layer and a cushion layer.

In an embodiment, the support layer may include a metal material or a reinforced fiber composite.

In an embodiment, the cushion layer may include at least one of an acrylic-based polymer, a urethane-based polymer, a silicon-based polymer, and an imide-based polymer.

In an embodiment, the electronic device may further include a protective layer disposed between the display module and the support plate, the protective layer including a polyimide film or a polyethylene terephthalate film.

In an embodiment of the disclosure, an electronic device includes a display module including a folding display part foldable with respect to a folding axis extending in a first direction, and a first non-folding display part and a second non-folding display part spaced apart from each other in a second direction perpendicular to the first direction with the folding display part disposed between the first and second non-folding display parts; and a support plate disposed under the display module and including reinforced fibers aligned in a direction. The support plate may include a first sub-support plate including reinforced fibers that have long axes arranged in the second direction; a second sub-support plate disposed between the first sub-support plate and the display module, the second sub-support plate including reinforced fibers that have long axes parallel to the first direction; and a third sub-support plate disposed under the first sub-support plate and including reinforced fibers that have long axes parallel to the first direction.

In an embodiment, the support plate may include a fourth sub-support plate disposed under the third sub-support plate and including reinforced fibers that have long axes parallel to the first direction; and a fifth sub-support plate disposed between the third sub-support plate and the fourth sub-support plate, the fifth sub-support plate including reinforced fibers that have long axes parallel to the second direction.

In an embodiment, the folding axis may extend parallel to a short side of the display module or extend parallel to a long side of the display module.

In an embodiment, the support plate may include a plate folding part in which a plurality of openings are formed, and the plate folding part may overlap the folding display part.

In an embodiment, a width of each of the plurality of openings in the first direction may be greater than a width of each of the plurality of openings in the second direction.

In an embodiment, a plurality of openings may be formed in each of the first to third sub-support plates to correspond to the folding display part.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain principles of the disclosure. In the drawings.

DETAILED DESCRIPTION OF THE DRAWINGS

Figure 1A:
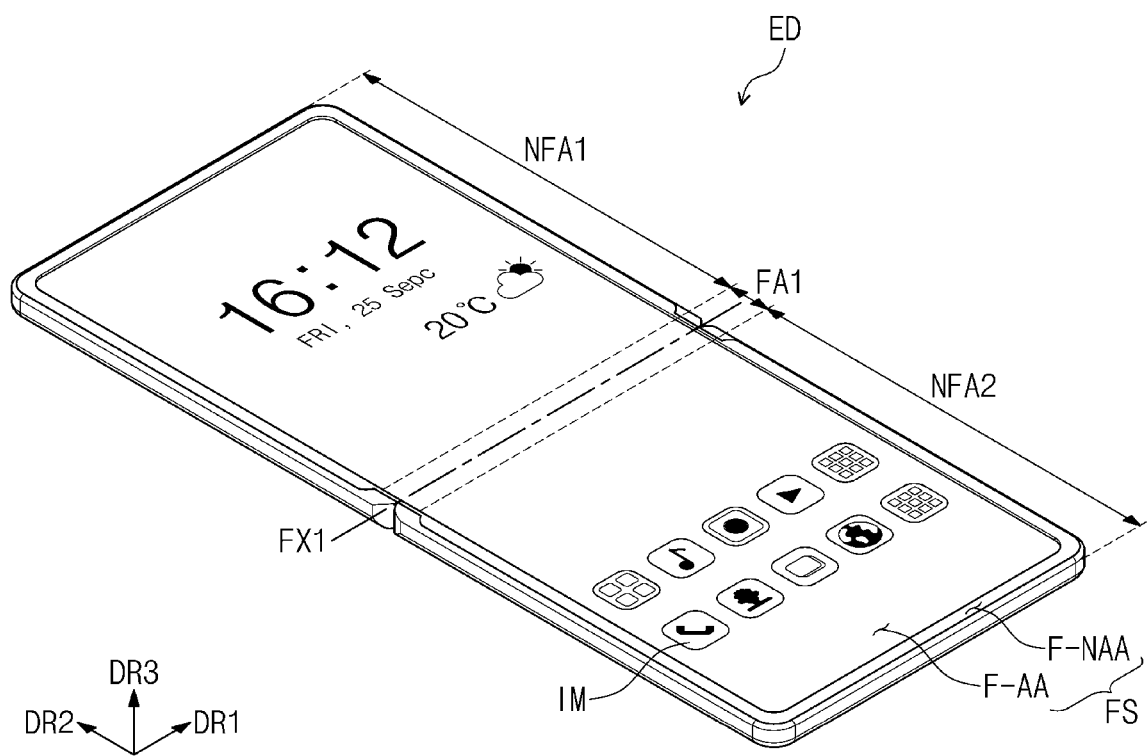
FIG. 1A is a perspective view schematically illustrating an unfolded state of an electronic device according to an embodiment.

Since the disclosure may have diverse modified embodiments, specific embodiments are illustrated in the drawings and are described in the detailed description of the disclosure. However, this does not limit the disclosure within specific embodiments and it should be understood that the disclosure covers all the modifications, equivalents, and replacements within the idea and technical scope of the present disclosure.

In this specification, it will also be understood that when one component (or area, layer, portion) is referred to as being "on," "connected to," or "coupled to" another component, it can be directly disposed/connected/coupled on/to the one component, or an intervening third component may also be present.

In this specification, "directly disposed" may mean that there is no layer, film, area, plate, or the like between a portion of the layer, the layer, the area, the plate, or the like and the other portion. For example, "directly disposed" may mean being disposed without using an additional member such and an adhesion member between two layers or two members.

Like reference numerals refer to like elements throughout. Also, in the figures, the thickness, ratio, and dimensions of components are exaggerated for clarity of illustration.

The term "and/or" includes any and all combinations of one or more of the associated listed items.

It will be understood that although the terms such as "first" and "second" are used herein to describe various elements, these elements should not be limited by these terms. The terms are only used to distinguish one component from other components. For example, a first element referred to as a first element in an embodiment can be referred to as a second element in another embodiment without departing from the scope of the appended claims. The terms of a singular form may include plural forms unless referred to the contrary.

Also, "under," "below," "above," "upper," and the like are used for explaining relation association of components illustrated in the drawings. The terms may be a relative concept and described based on directions expressed in the drawings. In this specification, the term "disposed on" may refer to a case in which it is disposed on a lower portion as well as an upper portion of any one member.

The phrase "at least one of" is intended to include the meaning of "at least one selected from the group of" for the purpose of its meaning and interpretation. For example, "at least one of A and B" may be understood to mean "A, B, or A and B."

Unless otherwise defined or implies herein, all terms (including technical and scientific terms) used herein have the same meaning as commonly understood by a person of ordinary skill in the art to which this disclosure pertains. It will be further understood that terms, such as those defined in commonly used dictionaries, should be interpreted as having meanings consistent with their meaning in the context of the relevant art and the disclosure, and should be not interpreted in an ideal or excessively formal sense unless clearly so defined herein.

The meaning of "include" or "comprise" specifies a property, a fixed number, a step, an operation, an element, a component or a combination thereof, but does not exclude other properties, fixed numbers, steps, operations, elements, components or combinations thereof.

Hereinafter, an electronic device according to an embodiment of the disclosure will be described with reference to the accompanying drawings.

Figure 1B:
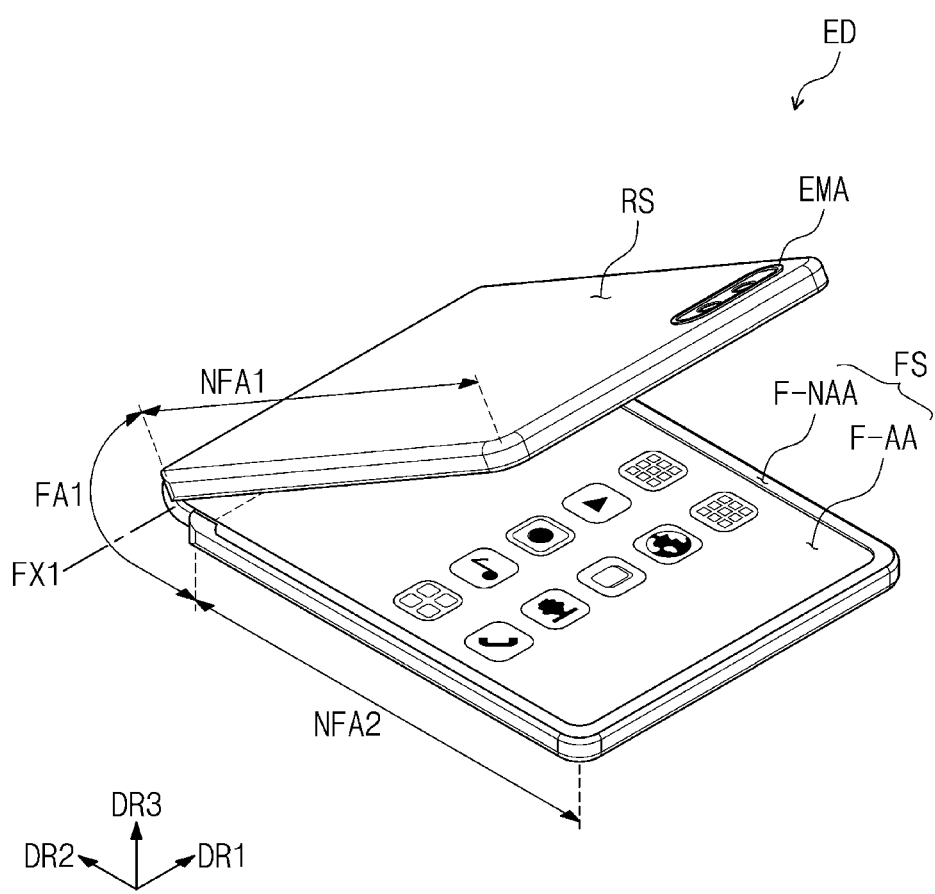
FIG. 1B is a perspective view schematically illustrating a process of in-folding the electronic device of FIG. 1A according to an embodiment.

FIG. 1A is a schematic perspective view illustrating an unfolded state of an electronic device according to an embodiment. FIG. 1B is a schematic perspective view illustrating a process of folding the electronic device of FIG. 1A according to an embodiment.

An electronic device ED according to an embodiment may be a device that is activated according to an electrical signal. For example, the electronic device ED may be a mobile phone, a tablet PC, a car navigation system, a game console, or a wearable device, but the embodiment is not limited thereto. In the specification as illustrated in FIG. 1A, the electronic device ED is illustrated as a mobile phone.

Referring to FIGS. 1A and 1B, the electronic device ED according to an embodiment may include a first display surface FS defined by a first direction DR1 and a second direction DR2 intersecting the first direction DR1. The electronic device ED may provide an image IM to a user through the first display surface FS. The electronic device ED according to an embodiment may display the image IM in a direction of a third direction DR3 on the first display surface FS that is parallel to the first direction DR1 and the second direction DR2. In this specification, a front surface (or a top surface) and a rear surface (or a bottom surface) of each of constituents may be defined based on a direction in which the image IM is displayed. The front and rear surfaces may be opposite to each other in the third direction DR3. A normal direction of each of the front and rear surfaces may be parallel to the third direction DR3.

The electronic device ED according to an embodiment may include a second display surface RS, and the second display surface RS may be defined as a surface facing at least a portion of the first display surface FS. In the in-folded state, the second display surface RS may be visually recognized by the user. The second display surface RS may include an electronic module area EMA in which electronic modules including various types of constituents are disposed. In an embodiment, an image may be provided through the second display surface RS.

The electronic device ED according to an embodiment may sense an external input applied from the outside. The external input may include various types of inputs provided from the outside of the electronic device ED. For example, the external input may include an external input (for example, hovering) applied to be proximity to or adjacent by a predetermined distance to the electronic device ED as well as to contact a portion of the human body such as a user's hand. The external input may include various types such as force, a pressure, a temperature, light, and the like.

FIG. 1A and the following drawings illustrate the first to third direction DR1 to DR3, and directions indicated by the first to third direction DR1, DR2, and DR3, which are described in this specification, may be relative concepts and thus may be changed to different directions. Also, the directions indicated by the first to third direction DR1, DR2, and DR3 may be described as first to fourth directions, and the same reference numerals may be used.

The first display surface FS of the electronic device ED may include a first active area F-AA and a first peripheral area F-NAA. The first active area F-AA may be an area that is activated according to an electrical signal. The electronic device ED according to an embodiment may display the image IM through the first active area F-AA. Also, various types of external inputs may be sensed on the first active area F-AA. The first peripheral area F-NAA is adjacent to the first active area F-AA. The first peripheral area F-NAA may have a predetermined color. The first peripheral area F-NAA may surround the first active area F-AA. Accordingly, a shape of the first active area F-AA may be substantially defined by the first peripheral area F-NAA. However, this is merely an example, and the first peripheral area F-NAA may be disposed adjacent to only a side of the first active area F-AA or may be omitted. The electronic device ED according to an embodiment may include active areas having various shapes, but is not limited to a specific embodiment.

The electronic device ED may include a folding area FA1 and non-folding areas NFA1 and NFA2. The electronic device ED may include non-folding areas NFA1 and NFA2. The electronic device ED according to an embodiment may include a first non-folding area NFA1 and a second non-folding area NFA2, which are disposed with the folding area FA1 therebetween. FIGS. 1A and 1B illustrate an example of an electronic device ED including a folding area FA1, but the embodiment is not limited thereto. For example, folding areas may be defined on the electronic device ED.

An electronic device ED according to an embodiment may be folded based on (or foldable with respect to) a first folding axis FX1 extending in a direction parallel to the first direction DR1. FIG. 1B illustrates that the extending direction of the first folding axis FX1 is parallel to an extending direction of a short side of the electronic device ED. However, the embodiment is not limited thereto.

The folding area FA1 corresponds to a portion that is capable of being folded based on the first folding axis FX1 parallel to the first direction DR1. The folding area FA1 has a predetermined curvature and curvature radius. In an embodiment, the first non-folding area NFA1 and the second non-folding area NFA2 face each other, and the electronic device ED may be in-folded so that a display surface FS is not exposed to the outside.

Unlike illustrated in the drawings, the electronic device ED may be out-folded so that the display surface FS is exposed to the outside. In an embodiment, in the electronic device ED, the first display surface FS is visually recognized by the user in the unfolded state, and the second display surface RS is visually recognized by the user in the in-folded state. The second display surface RS may include an electronic module area EMA in which electronic modules including various types of constituents are disposed.

Various electronic modules may be disposed in the electronic module area EMA. For example, the electronic module may include at least one of a camera, a speaker, an optical sensor, or a thermal sensor. The electronic module area EMA may sense an external subject received through the first or second display surface FS or RS or provide a sound signal such as voice to the outside through the first or second display surface FS or RS. The electronic module may include constituents, but is not limited to a specific embodiment.

The electronic module area EMA may be surrounded by the first active area F-AA and the first peripheral area F-NAA. However, the embodiment is not limited thereto.

For example, the electronic module area EMA may be disposed in the first active area F-AA, but is not limited to a specific embodiment.

Figure 2A:
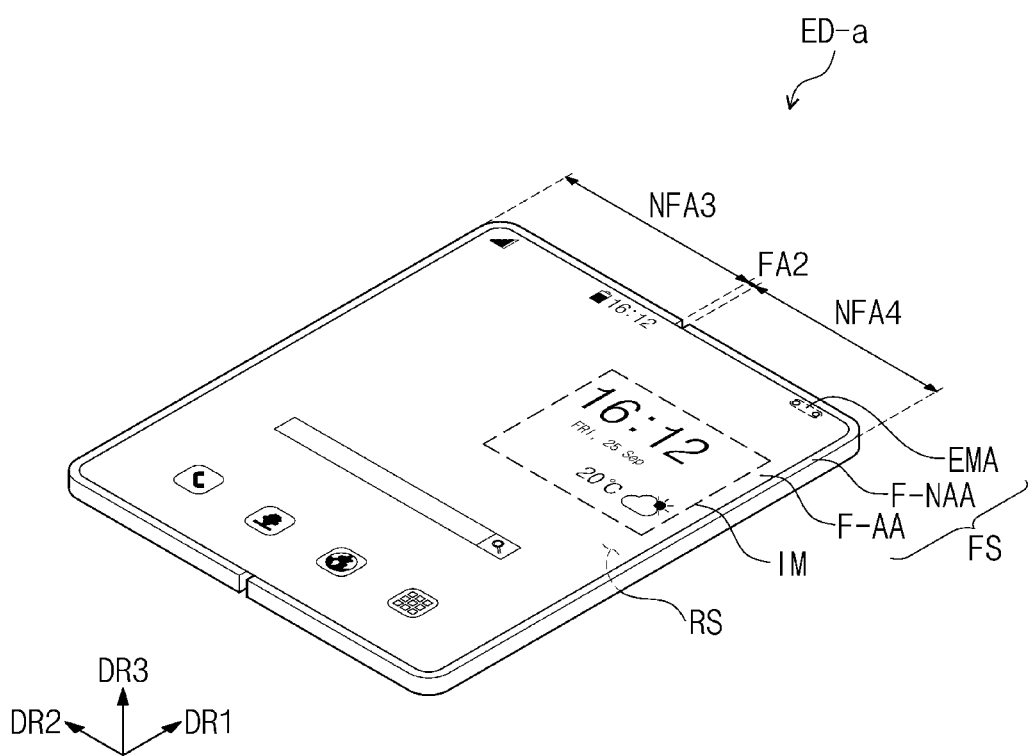
FIG. 2A is a perspective view schematically illustrating an unfolded state of an electronic device according to an embodiment.
Figure 2B:
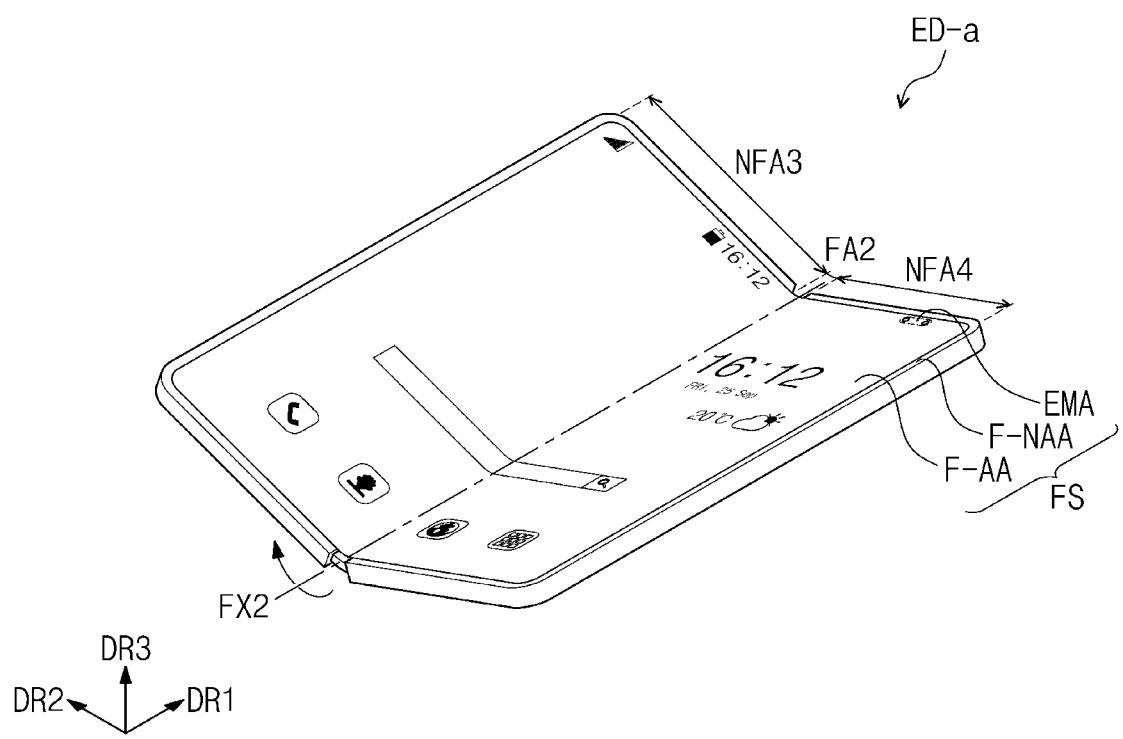
FIG. 2B is a perspective view schematically illustrating a process of in-folding the electronic device of FIG. 2A according to an embodiment.
Figure 2C:
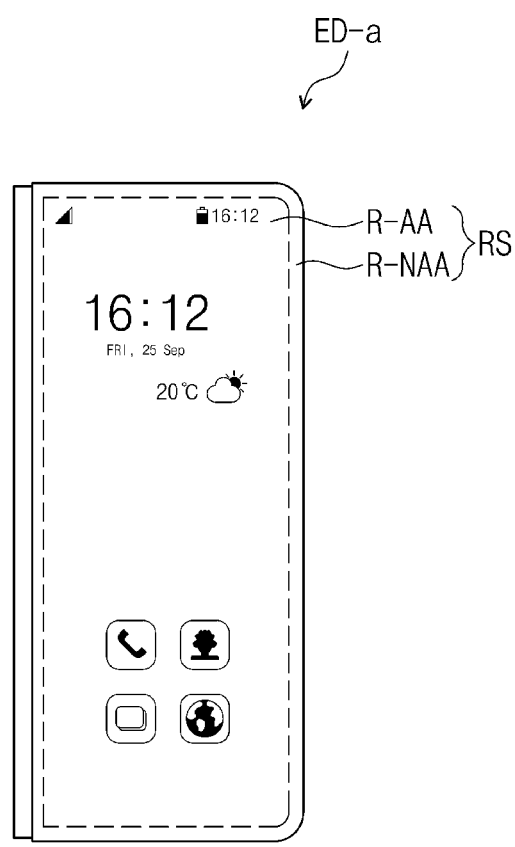
FIG. 2C is a plan view schematically illustrating an in-folded state of the electronic device of FIG. 2A according to an embodiment.
Figure 2D:
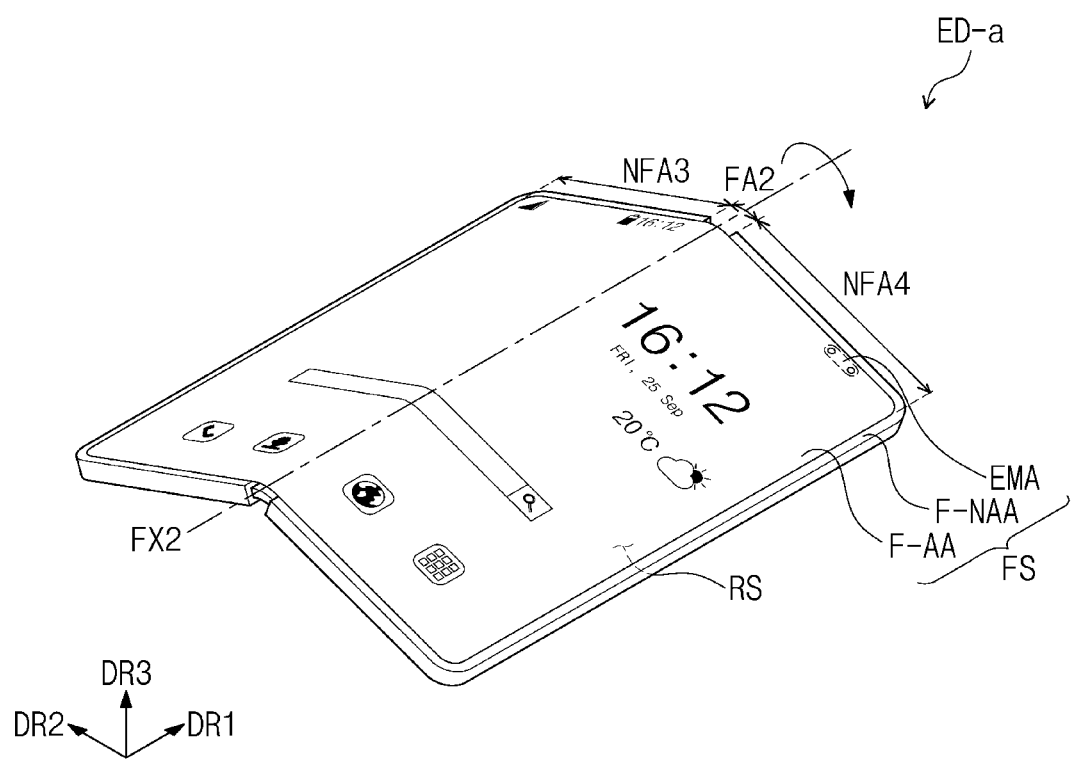
FIG. 2D is a perspective view schematically illustrating a process of out-folding the electronic device according to an embodiment.

FIG. 2A is a schematic perspective view illustrating an unfolded state of an electronic device according to an embodiment. FIG. 2B is a schematic perspective view illustrating a process of in-folding the electronic device of FIG. 2A according to an embodiment. FIG. 2C is a schematic plan view illustrating an in-folded state of the electronic device of FIG. 2A according to an embodiment. FIG. 2D is a schematic perspective view illustrating a process of out-folding the electronic device according to an embodiment.

An electronic device ED-a according to an embodiment may include a first display surface FS and a second display surface RS. The first display surface FS may include a first active area F-AA and a first peripheral area F-NAA. An electronic module area EMA may be included in the first active area F-AA. The second display surface RS may be defined as a surface facing at least a portion of the first display surface FS. For example, the second display surface RS may be defined as a portion of a rear surface of the electronic device ED.

The electronic device ED-a according to an embodiment may include at least one folding area FA2 and non-folding areas NFA3 and NFA4 extending from or adjacent to the folding area FA2. The non-folding areas NFA3 and NFA4 may be disposed to be spaced apart from each other with the folding area FA2 therebetween.

Referring to FIG. 2B, the electronic device ED-a according to an embodiment may be folded based on a second folding axis FX2. The second folding axis FX2 may be a virtual axis extending in the direction of the first direction DR1, and the second folding axis FX2 may be parallel to a direction of a long side of the electronic device ED-a. The second folding axis FX2 may extend in the first direction DR1 on the first display surface FS.

In an embodiment, the non-folding areas NFA3 and NFA4 may be disposed adjacent to the folding area FA2 with the folding area FA2 therebetween. For example, a first non-folding area NFA3 may be disposed at a side of the folding area FA2 in the second direction DR2, and a second non-folding area NFA4 may be disposed at another side of the folding area FA2 in the second direction DR2.

The electronic device ED-a may be folded based on the second folding axis FX2 and thus be transformed into an in-folded state in which an area of the first display surface FS, which overlaps the first non-folding area NFA3, and another area of the first display surface FS, which overlaps the second non-folding area NFA4, face each other.

Referring to FIG. 2C, in the electronic device ED-a according to an embodiment, the second display surface RS may be visually recognized by the user in the in-folded state. In this case, the second display surface RS may include a second active area R-AA displaying an image and a second peripheral area R-NAA adjacent to the second active area R-AA. The second active area R-AA may be an area activated according to an electrical signal. The second active area R-AA is an area in which an image may be displayed, and various types of external inputs may be sensed. The second peripheral area R-NAA may have a predetermined color. The second peripheral area R-NAA may surround the second active area R-AA. Although not shown in the drawings, the second display surface RS may further include an electronic module area in which electronic modules including various types of constituents are disposed, but is not limited to a specific embodiment.

Referring to FIG. 2D, the electronic device ED-a according to an embodiment may be folded based on the second folding axis FX2 and then be transformed into an out-folded state in which an area of the second display surface RS, which overlaps the first non-folding area NFA3, and another area of the second display surface RS, which overlaps the second non-folding area NFA4, face each other.

However, this embodiment is not limited thereto. For example, the electronic device ED may be folded based on folding axes so that a portion of the first display surface FS and a portion of the second display surface RS face each other. Here, the number of folding axes and the number of non-folding areas are not specifically limited.

In an embodiment, the electronic devices ED and ED-a may be configured so that the in-folding or out-folding operation may be repeated based on each other through an unfolding operation, but the embodiment is not limited thereto. In an embodiment, the electronic devices ED and ED-a may be configured to select one of the unfolding operation, the in-folding operation, and the out-folding operation.

Figure 3:
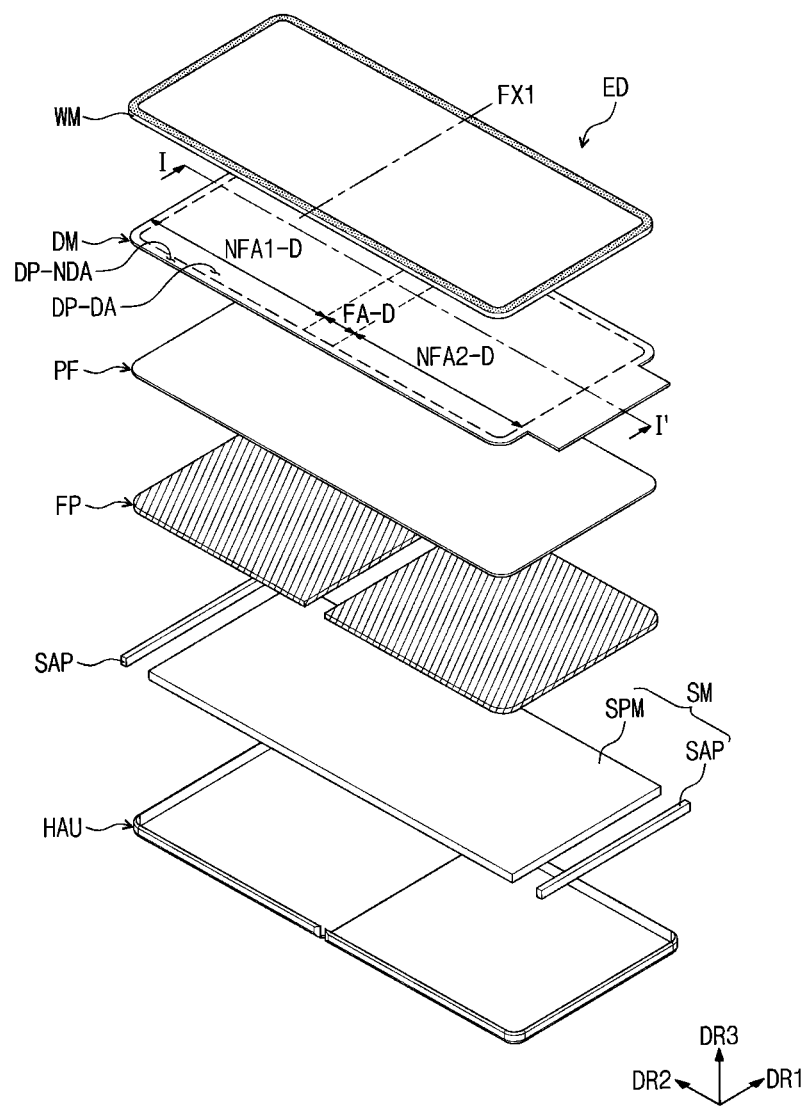
FIG. 3 is a schematic exploded perspective view of a display device according to an embodiment.
Figure 4:
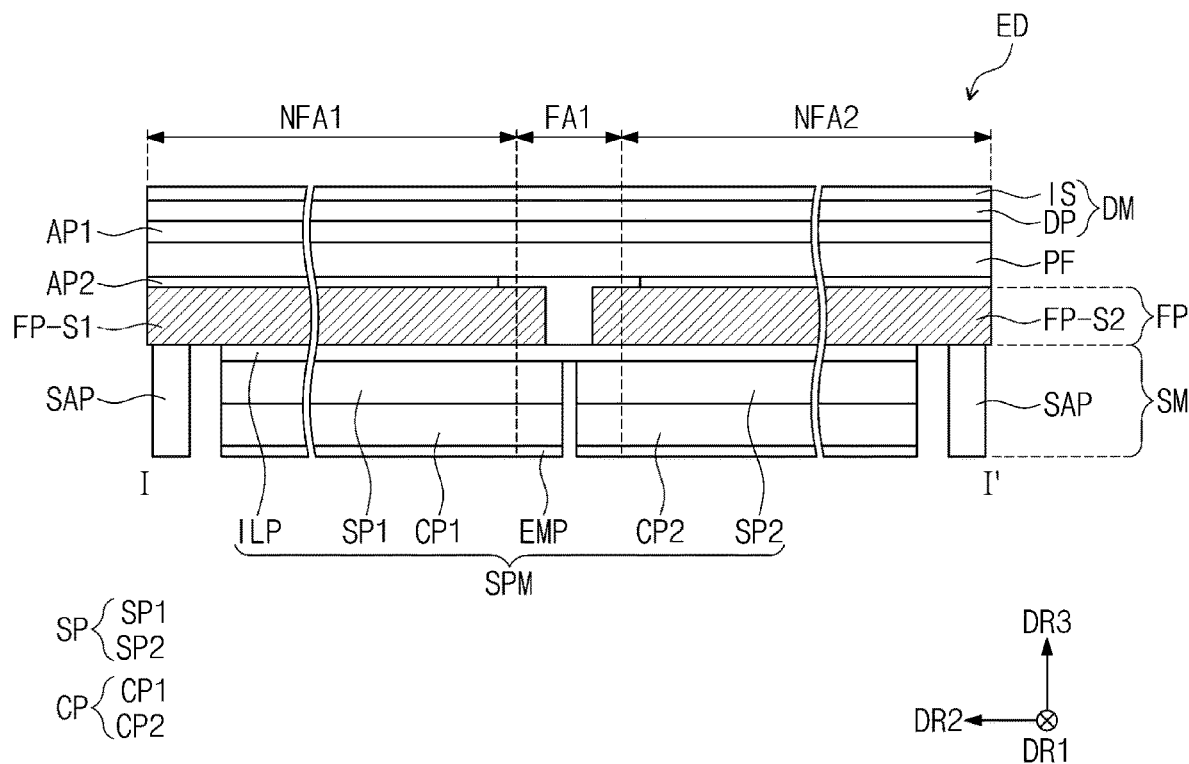
FIG. 4 is a schematic cross-sectional view of the electronic device according to an embodiment.

FIG. 3 is a schematic exploded perspective view of the display device according to an embodiment, and FIG. 4 is a schematic cross-sectional view of the electronic device according to an embodiment. FIG. 3 is a schematic exploded perspective view of the electronic device of FIG. 1A according to an embodiment. FIG. 4 is a schematic cross-sectional view illustrating a portion corresponding to line I-I' of FIG. 3.

Referring to FIGS. 3 and 4, the electronic device ED according to an embodiment may include a display module DM and a support plate FP disposed under the display module DM. The electronic device ED according to an embodiment may include the display module DM, the support plate FP, a support member SM, and a protective layer PF.

The electronic device ED may include a window member WM disposed on the display module DM, and the window member WM may overlap the entire outside of the display module DM. The window member WM may have a shape corresponding to that of the display module DM. The electronic device ED may include a housing HAU that accommodates the display module DM and the support plate FP. The housing HAU may be coupled (or connected) to the window member WM. Although not shown in the drawings, the housing HAU may further include a hinge structure to facilitate folding or bending.

The window member WM may include a window and an adhesive layer. In the electronic device ED according to an embodiment, the window may include an optically transparent insulating material. The window may be a glass substrate or a polymer substrate. For example, the window may be a tempered glass substrate that is reinforced. The adhesive layer may be disposed between the display module DM and the window. The adhesive layer may be an optically clear adhesive film (OCA) or an optically clear adhesive resin layer (OCR). In an embodiment, the adhesive layer may be omitted.

The display module DM may display an image according to an electrical signal and transmit/receive information on an external input. The display module DM may be defined as a display area DP-DA and a non-display area DP-NDA. The display area DP-DA may be defined as an area that emits the image provided from the display module DM.

The non-display area DP-NDA is adjacent to the display area DP-DA. For example, the non-display area DP-NDA may surround the display area DP-DA. However, this is merely an example. For example, the non-display area DP-NDA may have various shapes and is not limited to a specific embodiment. According to an embodiment, the display area DP-DA of the display module DM may correspond to at least a portion of the first active area F-AA (see FIG. 1A).

The display module DM may include a display panel DP and an input sensor IS disposed on the display panel DP. Although not shown in the drawings, the display module DM may further include an optical layer (not shown) disposed on the input sensor IS. The optical layer (not shown) may function to reduce reflection by external light. For example, the optical layer (not shown) may include a polarizing layer or a color filter layer.

The display panel DP may include a base layer, a circuit element layer disposed on the base layer, a display element layer disposed on the circuit element layer, and a thin-film encapsulation layer disposed on the display element layer. The base layer may include a polymer material. For example, the base layer may include polyimide.

The circuit element layer may include an organic layer, an inorganic layer, a semiconductor pattern, a conductive pattern, and a signal line. The organic layer, the inorganic layer, the semiconductor layer, and the conductive layer may be formed on the base layer in a manner such as coating, deposition, and the like. Thereafter, the organic layer, the inorganic layer, the semiconductor layer, and the conductive layer may be selectively patterned by photolithography processes to form the semiconductor pattern, the conductive pattern, and the signal line.

The display element layer may include a light emitting element. The light emitting element is electrically connected to at least one transistor. The thin-film encapsulation layer may be disposed on the circuit element layer to seal the display element layer. The thin-film encapsulation layer may include an inorganic layer, an organic layer, and an inorganic layer, which are sequentially laminated. The lamination structure of the thin-film encapsulation layer is not particularly limited.

The input sensor IS may include sensing electrodes configured to sense the external input. The input sensor IS may be a capacitive sensor, but is not particularly limited. When manufacturing the display panel DP, the input sensor IS may be directly formed on the thin-film encapsulation layer by a continuous process. However, the embodiment is not limited thereto, and the input sensor IS may be provided as a panel that is separated from the display panel DP and may be attached to the display panel DP by the adhesive layer.

The display module DM may include a folding display part FA-D and non-folding display parts NFA1-D and NFA2-D. The folding display part FA-D may be a portion corresponding to the folding area FA1 (see FIG. 1A), and the non-folding display parts NFA1-D and NFA2-D may be portions corresponding to the non-folding areas NFA1 and NFA2 (see FIG. 1A).

The folding display part FA-D may be a portion that is folded or bent based on the first folding axis FX1. The display module DM may include a first non-folding display part NFA1-D and a second non-folding display part NFA2-D, and the first non-folding display part NFA1-D and the second non-folding display part NFA2-D may be spaced from each other with the folding display part FA-D therebetween.

The support plate FP may be disposed under the display module DM. In an embodiment, the support plate FP may include a reinforced fiber composite. In an embodiment, the support plate FP may include a first plate FP-S1 and a second plate FP-S2, which are spaced apart from each other. The first plate FP-S1 and the second plate FP-S2 may be spaced apart from each other in a direction of the second direction DR2 perpendicular to the extending direction of the first folding axis FX1. The first plate FP-S1 may overlap the first non-folding display portion NFA1-D, and the second plate FP-S2 may overlap the second non-folding display portion NFA2-D.

The support plate FP may include a reinforced fiber composite to be easily adjusted in thickness. For example, when compared to a case of using a support plate made of (or including) a metal material, in the support plate FP including the reinforced fiber composite, the support plate FP may be easily adjusted in thickness by laminating sub-support plates formed using a matrix part MX (see FIG. 6) and a reinforced fiber FB or by thickening the matrix part MX (see FIG. 6) and the reinforced fiber FB, which are formed as a support plate.

A thickness of the support plate FP may be changed in consideration of mechanical design characteristics of the electronic device ED and mechanical properties of the electronic device ED. For example, the support plate FP may have a thickness of about 50 µm to about 500 µm, but the embodiment is not limited thereto.

A protective layer PF may be disposed between the display module DM and the support plate FP. The protective layer PF may be a layer disposed under the display module DM to protect a rear surface of the display module DM. The protective layer PF may overlap the entire display module DM. The protective layer PF may include a polymer material. For example, the protective layer PF may be a polyimide film or a polyethylene terephthalate film. However, this is merely an example, and the material of the protective layer PF is not limited thereto.

The electronic device ED according to an embodiment may further include a support member SM. The support member SM may include a support part SPM and a filling part SAP. The support part SPM may be a portion that overlaps most areas of the display module DM. The filling part SAP may be a portion disposed outside the support part SPM and overlapping an outer periphery of the display module DM.

The support member SM may include at least one of a support layer SP or a cushion layer CP. Also, the support member SM may further include at least one of a shielding layer EMP or an interlayer bonding layer ILP.

For example, the support layer SP may include a metal material or a reinforced fiber composite. The support layer SP may be disposed under the support plate FP. The support layer SP may be a thin metal substrate. Also, unlike this, the support layer SP may be made of (or include) a reinforced fiber composite including glass fibers or carbon fibers. In case that the support layer SP is the thin metal substrate, the support layer SP may include stainless steel, aluminum, or an alloy thereof. The support layer SP may have a function such as heat dissipation or electromagnetic wave shielding.

In the embodiment illustrated in FIG. 4, the cushion layer CP may be disposed under the support layer SP. The cushion layer CP may prevent the support plate FP from being pressed and plastic-deformed by external impacts and force. The cushion layer CP may improve impact resistance of the electronic device ED. The cushion layer CP may include a sponge, foam, or an elastomer such as a urethane resin. Also, the cushion layer CP may include at least one of an acrylic-based polymer, a urethane-based polymer, a silicon-based polymer, or an imide-based polymer. However, the embodiment is not limited thereto.

In FIG. 4 and other drawings, the cushion layer CP is disposed under the support layer SP, but the embodiment is not limited thereto. For example, the cushion layer CP may be disposed on the support layer SP.

In the electronic device ED according to an embodiment, a configuration of the support member SM may vary depending on a size and shape of the electronic device ED or operation characteristics of the electronic device ED. For example, the support member SM may include support layers SP or cushion layers CP. Also, in an embodiment, one of the support layer SP and the cushion layer CP may be omitted in the support member SM, or the support member SM may include only the support layer SP or the cushion layer CP.

The support layer SP may include a first sub-support layer SP1 and a second sub-support layer SP2, which are spaced apart from each other in the direction of the second direction DR2. The first sub-support layer SP1 and the second sub-support layer SP2 may be spaced apart from each other at a portion corresponding to the first folding axis FX1. The support layers SP may be spaced from each other in the folding area FA1 and thus be provided as the first sub-support layer SP1 and the second sub-support layer SP2 to improve the folding or bending characteristics of the electronic device ED.

Also, the cushion layer CP may include a first sub-cushion layer CP1 and a second sub-cushion layer CP2, which are spaced apart from each other in the direction of the second direction DR2. The first sub-cushion layer CP1 and the second sub-cushion layer CP2 may be spaced apart from each other at a portion corresponding to the first folding axis FX1. The cushion layers CP may be spaced apart from each other in the folding area FA1 and thus be provided as the first sub-cushion layer CP1 and the second sub-cushion layer CP2 to improve the folding or bending characteristics of the electronic device ED.

The support member SM may further include a shielding layer EMP. The shielding layer EMP may be an electromagnetic shielding layer or a heat dissipating layer. Also, the shielding layer EMP may function as a bonding layer. The support member SM and the housing HAU may be coupled to each other by using the shielding layer EMP. In FIG. 4 and other drawings, the shielding layer EMP is disposed under the cushion layer CP, but the embodiment is not limited thereto.

The support member SM may further include an interlayer bonding layer ILP disposed on the support layer SP. The interlayer bonding layer ILP may bond the support plate FP to the support member SM. The interlayer bonding layer ILP may be provided in the form of a bonding resin layer or adhesive tape. For example, the interlayer bonding layer ILP may overlap the entire folding display part FA-D. However, the embodiment is not limited thereto, and a portion of the interlayer bonding layer ILP overlapping the folding display part FA-D may be removed.

The filling part SAP may be disposed outside the support layer SP and the cushion layer CP. The filling part SAP may be disposed between the support plate FP and the housing HAU. The filling part SAP may fill a space between the support plate FP and the housing HAU and fix the support plate FP.

Also, the electronic device ED according to an embodiment may further include at least one of an adhesive layer AP1 or AP2. For example, the first adhesive layer AP1 may be disposed between the display module DM and the protective layer PF, and the second adhesive layer AP2 may be disposed between the protective layer PF and the support plate FP. At least one of the adhesive layer AP1 or AP2 may be an optically clear adhesive film (OCA) or an optically clear adhesive resin layer (OCR). However, the embodiment is not limited thereto, and at least one of the adhesive layer AP1 or AP2 may be an adhesive layer having a transmittance of about 80% or less.

Although not shown in the drawings, the electronic device ED according to an embodiment may further include an adhesive layer disposed between the support layer SP and the cushion layer CP.

Also, in FIG. 3 and other drawings, the folding axis FX1 is parallel to the short side of the electronic device ED, but the embodiment is not limited thereto. For example, in the electronic device ED according to an embodiment, the folding axis FX1 may be parallel to the long side of the electronic device ED.

Figure 5:
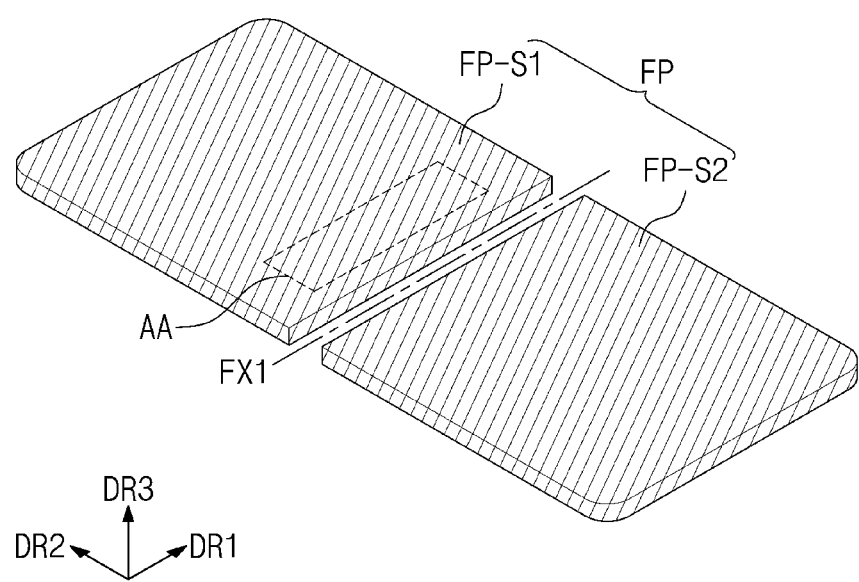
FIG. 5 is a schematic perspective view of a support plate according to an embodiment.
Figure 6:
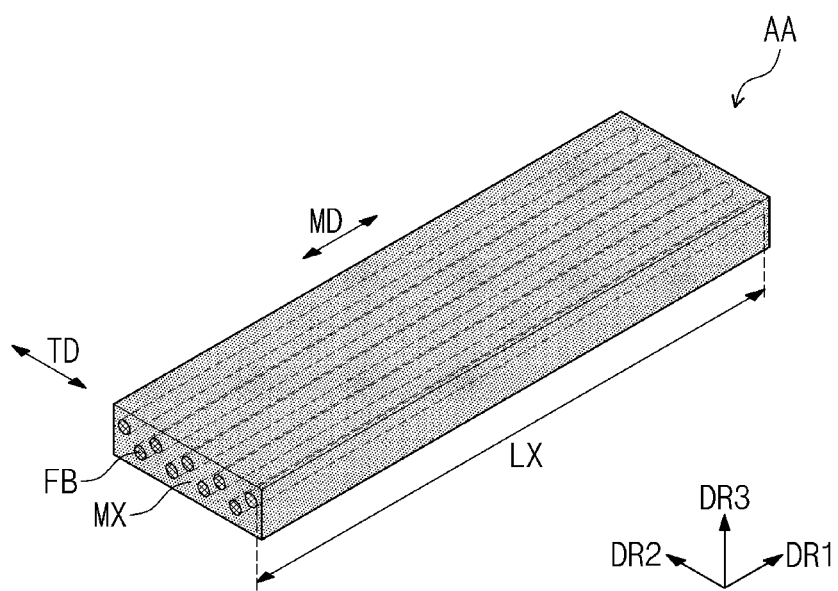
FIG. 6 is a perspective view schematically illustrating a portion of the support plate according to an embodiment.
Figure 7A:
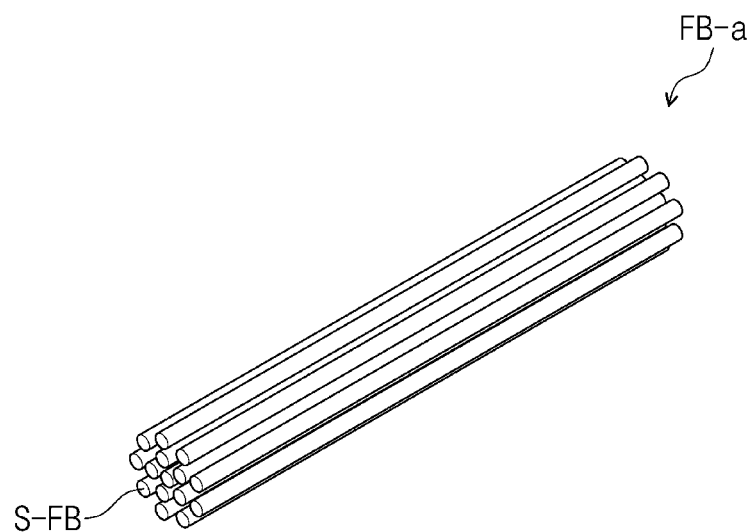
FIG. 7A is a schematic perspective view of a reinforced fiber according to an embodiment of the disclosure.
Figure 7B:
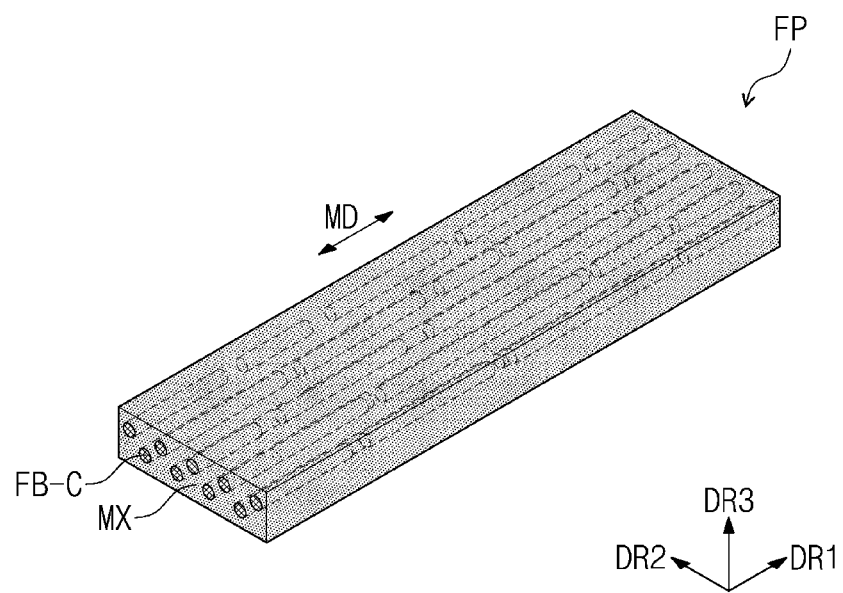
FIG. 7B is a perspective view schematically illustrating a portion of the support plate according to an embodiment of the disclosure.

FIG. 5 is a schematic perspective view of the support plate according to an embodiment. FIG. 6 is a schematic perspective view illustrating a portion of the support plate. FIG. 6 is a schematic enlarged view illustrating area AA of FIG. 5. FIG. 7A is a schematic perspective view illustrating a reinforced fiber included in the support plate according to an embodiment. FIG. 7B is a schematic perspective view illustrating the support plate according to an embodiment.

Referring to FIGS. 5 and 6, the support plate FP according to an embodiment may include reinforced fibers FB. In an embodiment, the support plate FP may include a reinforced fiber composite including the reinforced fibers FB. The support plate FP including the reinforced fiber composite may further include a matrix part MX. The reinforced fibers FB may be dispersed and arranged in the matrix part MX.

The reinforced fibers FB may be carbon fibers or glass fibers. The matrix part MX may include a polymer resin. The matrix part MX may be made of a thermoplastic resin. For example, the matrix part MX may include a polyamide-based resin or a polypropylene-based resin. For example, the reinforced fiber composite may be carbon fiber reinforced plastic (CFRP) or glass fiber reinforced plastic (GFRP).

The electronic device ED according to an embodiment may be lightened by including the reinforced fiber composite as the support plate FP. The support plate FP according to an embodiment may have a lighter weight compared to a metal material by including the reinforced fiber composite, and may have modulus and strength values similar to those of the metal plate. Therefore, the electronic device ED according to an embodiment may have desirable mechanical properties and reliability characteristics while having the lighter weight compared to the case of using the metal support plate.

Also, the support plate FP according to an embodiment includes a polymer resin as the matrix part MX and may be more easily processed to form its shape when compared to the metal plate. For example, the shape may be processed by laser-cutting the support plate FP including the reinforced fiber composite. Openings OP (see FIG. 11) to be described below may be easily defined in the support plate FP using a laser-cutting method.

Each of the reinforced fibers FB may extend in a direction, and the reinforced fibers FB have long-axis directions LX arranged to be parallel to each other in one direction. The extension direction or the long-axis directions LX of the reinforced fibers FB may correspond to a machine direction MD in the process of manufacturing the reinforced fiber composite. The machine direction MD may be referred to as a longitudinal direction, and a transverse direction TD that is perpendicular to the machine direction MD may be referred to as a transverse direction.

In the support plate FP according to an embodiment, the long-axis directions LX, which are the arrangement direction of the reinforced fibers FB, may be parallel to the direction of the folding axis FX1. For example, the support plate FP according to an embodiment may be a longitudinal plate of which the long axes of the reinforced fibers FB are arranged in parallel with the folding axis FX1.

In an embodiment, each of the reinforced fibers FB included in the support plate FP may be provided as a strand. Also, in an embodiment, the reinforced fibers FB included in the support plate FP may extend as a strand in the machine direction MD.

In an embodiment, the configuration of the reinforced fiber composite included in the support plate FP may be different from that illustrated in FIG. 6. Referring to FIG. 7A, reinforced fibers FB-a included in the support plate FP according to an embodiment may be configured as a set of sub-fibers S-FB. For example, the sub-fibers S-FB may be joined as a bundle to form a strand of reinforced fibers FB-a.

Referring to FIG. 7B, reinforced fibers FB-C included in the support plate FP are not continuous in the machine direction MD, and a length of each of the reinforced fibers FB-C in the long axis direction LX may be less than that of each of the reinforced fibers FB illustrated in FIG. 6. All the long axes of the reinforced fibers FB-C of FIG. 7B according to an embodiment may be aligned in the machine direction MD. The reinforced fibers FB-C may be dispersed and arranged in the matrix part MX.

Figure 8:
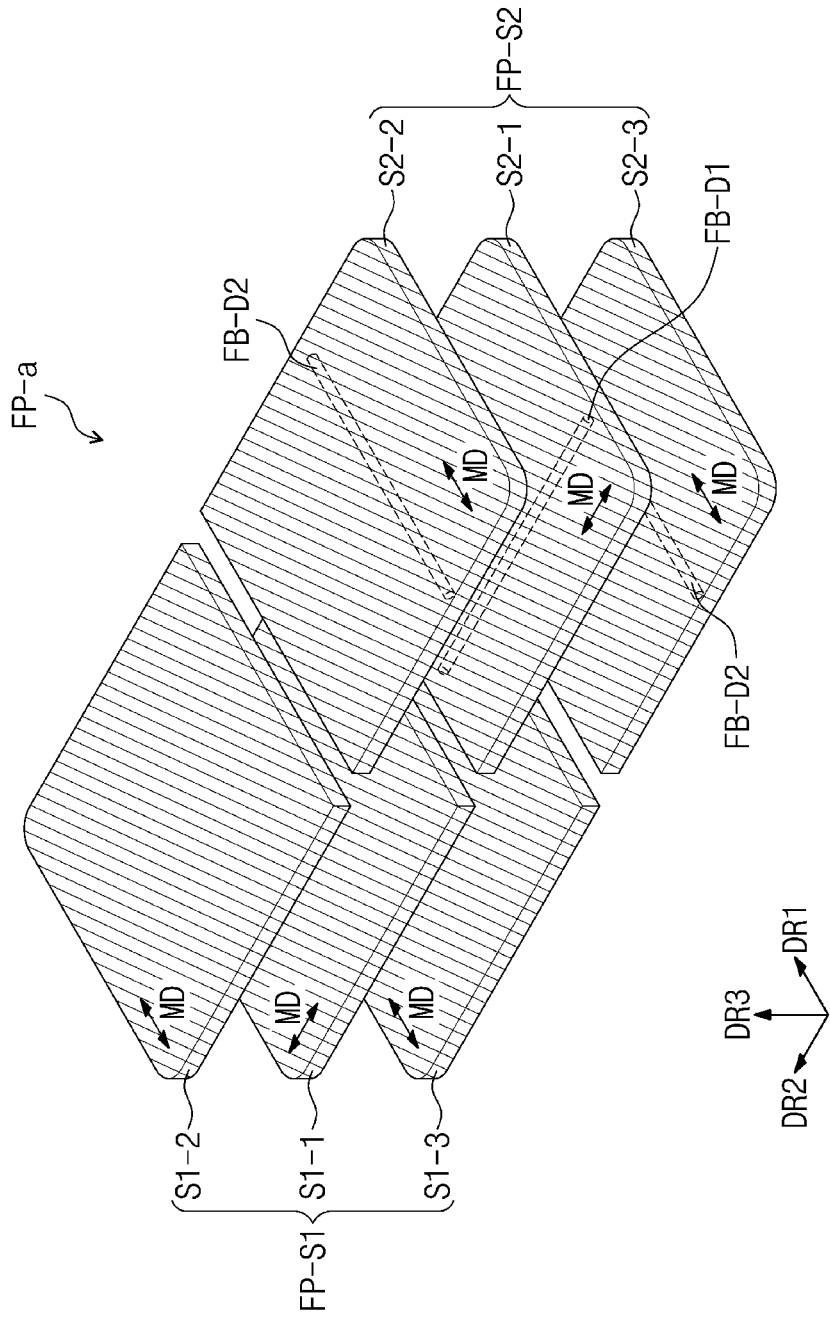
FIG. 8 is a schematic exploded perspective view of a support plate according to an embodiment of the disclosure.

FIG. 8 is a schematic perspective view of a support plate according to an embodiment. Referring to FIG. 8, a support plate FP-a according to an embodiment includes sub-support plates S1-1 to S1-3 and S2-1 to S2-3, which are laminated in a direction of the third direction DR3, which is a thickness direction. Each of the sub-support plates S1-1 to S1-3 and S2-1 to S2-3 may be made of a reinforced fiber composite including reinforced fibers.

In an embodiment, the support plate FP-a may include first sub-support plates S1-1 and S2-1 and second sub-support plates S1-2 and S2-2, which are laminated in the thickness direction. The first sub-support plates S1-1 and S2-1 may include first reinforced fibers FB-D1 each of which has a long axis parallel to the second direction DR2 that is perpendicular to the extending direction of the folding axis. Also, the second sub-support plates S1-2 and S2-2 may include second reinforced fibers FB-D2 each of which has a long axis parallel to the first direction DR1 that is the extension direction of the folding axis.

Each of the first sub-support plates S1-1 and S2-1 may be a transverse sub-support plate including the first reinforced fibers FB-D1 each of which has a long axis extending in the second direction DR2 perpendicular to the first direction DR1 that is the extension direction of the folding axis. Also, each of the second sub-support plate S1-2 and S2-2 may be a longitudinal sub-support plate including the second reinforced fibers FB-D2 each of which has a long axis parallel to the first direction DR1 that is the extension direction of the folding axis.

The support plate FP-a according to an embodiment may have high mechanical strength because of the reinforced fibers aligned in a direction while having desirable folding characteristics by including both the longitudinal sub-support plate and the transverse sub-support plate.

In an embodiment, the support plate FP-a may include three or more sub-support plates S1-1 to S1-3 and S2-1 to S2-3, which are laminated in the thickness direction. The support plate FP-a according to an embodiment may include the first sub-support plates S1-1 and S2-1, in which the long axes of the reinforced fibers are arranged parallel to the second direction axis DR2, the second sub-support plates S1-2 and S2-2, which are disposed above the first sub-support plates S1-1 and S2-1 and in which the long axes of the reinforced fibers are arranged parallel to the first direction DR1, and third sub-support plates S1-3 and S2-3, which are disposed under the first sub-support plates S1-1 and S2-1 and in which the long axes of the reinforced fibers are arranged parallel to the first direction DR1. As illustrated in FIG. 8, the machine direction MD illustrated in each sub-support plate corresponds to the arrangement direction of the long axes of the reinforced fibers.

In an embodiment, the second sub-support plates S1-2 and S2-2 may be disposed adjacent to the display module DM (see FIG. 4), and the third sub-support plates S1-3 and S2-3 may be disposed to be spaced apart from the display module DM (see FIG. 4). For example, the third sub-support plates S1-3 and S2-3 may be adjacent to the support member SM (see FIG. 4) added to a lower side of the support plate.

In the embodiment illustrated in FIG. 8, the second sub-support plates S1-2 and S2-2 correspond to the uppermost sub-support plate in the support plate FP-a, and the third sub-support plate S1-3 and S2-3 may correspond to the lowermost sub-support plate in the support plate FP-a.

The support plate FP-a according to an embodiment may include sub-support plates laminated so that the extension directions of the reinforced fibers intersect each other to realize desirable folding characteristics and excellent mechanical properties.

In FIG. 8, the support plate FP-a in which three sub-support plates are laminated is illustrated, but the embodiment is not limited thereto. In an embodiment, the support plate FP-a may include four or more sub-support plates or may include two sub-support plates. However, in case that the sub-support plates are provided, in an embodiment, the support plate FP-a may include at least one longitudinal sub-support plate and at least one transverse sub-support plate. In an embodiment, the support plate FP-a may include a longitudinal sub-support plate and a transverse sub-support plate, which are alternately arranged.

In an embodiment, in case that the support plate FP-a includes the laminated sub-support plates, the arrangement direction of the reinforced fibers FB-D2 included in the uppermost sub-support plates S1-2 and S2-2 and the lowermost sub-support plates S1-3 and S2-3 may be parallel to the folding axis FX1 (see FIG. 5). Also, in an embodiment, the support plate FP-a may include at least one of the sub-support plates S1-1 and S2-1, which is disposed between the uppermost sub-support plates S1-2 and S2-2 and the lowermost sub-support plates S1-3 and S2-3, which include the reinforced fibers FB-D2 arranged in the direction parallel to the folding axis FX1 (see FIG. 5), and in which the arrangement direction of the long axes of the reinforced fibers FB-D1 is perpendicular to the folding axis FX1 (see FIG. 5).

The support plate FP-a of FIG. 8 according to an embodiment may include a first plate FP-S1 and a second plate FP-S2, which are spaced apart from each other in the direction of the second direction DR2. Each of the first plate FP-S1 and the second plate FP-S2 may include sub-support plates laminated in the thickness direction.

The first plate FP-S1 may include a first sub-support plate S1-1, a second sub-support plate S1-2 disposed above the first sub-support plate S1-1, and a third sub-support plate S1-3 disposed under the first sub-support plate S1-1. Also, the second plate FP-S2 may include a first sub-support plate S2-1, a second sub-support plate S2-2 disposed above the first sub-support plate S2-1, and a third sub-support plate S2-3 disposed under the first sub-support plate S2-1.

For example, in an embodiment, each of the first plate FP-S1 and the second plate FP-S2, which are spaced apart from each other to respectively overlap the first non-folding display part NFA1-D and the second non-folding display part NFA2-D may include a longitudinal sub-support plate, a transverse sub-support plate, and a longitudinal sub-support plate which are sequentially laminated.

The electronic device according to an embodiment may be lightened by including the support plate including the reinforced fiber composite, and the support plate may include at least one sub-support plate including the reinforced fibers arranged in parallel to the extension direction of the folding axis to realize desirable mechanical properties in the direction parallel to the folding axis. Also, the electronic device according to an embodiment may include both the longitudinal sub-support plate and the transverse sub-support plate in the support plate to realize the desirable mechanical properties while having the desirable folding characteristics.

Table 1 below shows results obtained by comparing mechanical properties of stainless steel (SUS), which is a metal plate material, to those of a reinforced fiber composite, which is used as a material of the support plate FP. Carbon fiber reinforced plastic (CFRP) and glass fiber reinforced plastic (GFRP) were evaluated as materials of the support plate FP. Each of the CFRP and the GFRP may correspond to the structure in which the three sub-support plates are laminated as illustrated in FIG. 8.

TABLE 1

| Kinds | Thickness [mm] | Tensile strength [MPa] | Young's modulus [GPa] |
|---|---|---|---|
| SUS316 | 0.15 | 1325 | 176 |
| CFRP | 0.19 | 1040 (MD direction) | 99 (MD direction) |
|  |  | 724 (TD direction) | 51 (TD direction) |
| GFRP | 0.16 | 1552 (MD direction) | 76 (MD direction) |
|  |  | 820 (TD direction) | 43 (TD direction) |

Referring to Table 1, each of the CFRP and the GFRP had desirable tensile strength and Young's modulus. Particularly, each of the CFRP and the GFRP had a desirable level of tensile strength in the MD direction, which is the machine direction when compared to the stainless steel. In each of the CFRP and the GFRP, the Young's modulus was less than that of the stainless steel, and resistance to deformation was less than that of the stainless steel. Therefore, the electronic device according to an embodiment may include the support plate including the reinforced fiber composite to reduce a weight while having desirable tensile strength and low resistance to the folding deformation.

Hereinafter, an electronic device according to an embodiment will be described with reference to FIGS. 9 to 14. Hereinafter, in the description of the electronic device according to an embodiment, contents duplicated with those described with reference to FIGS. 1A to 8 will not be described again, and differences therebetween will be mainly described.

Figure 9:
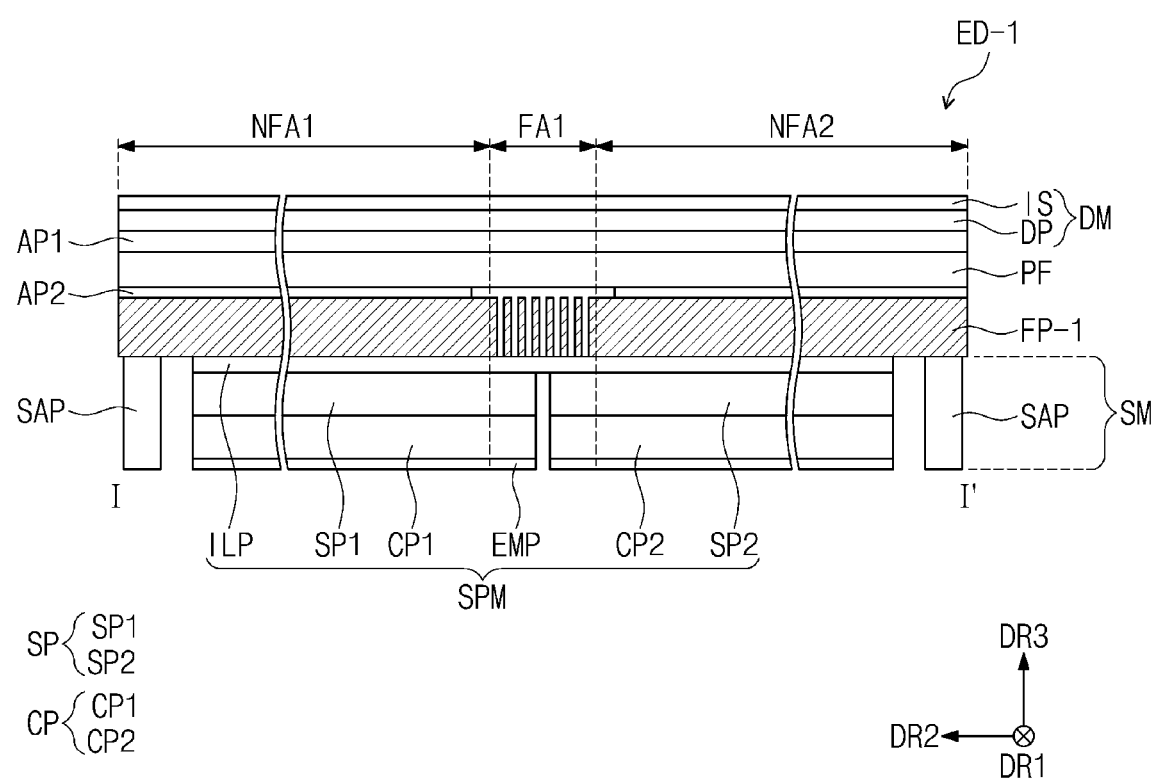
FIG. 9 is a schematic cross-sectional view of the electronic device according to an embodiment.
Figure 10:
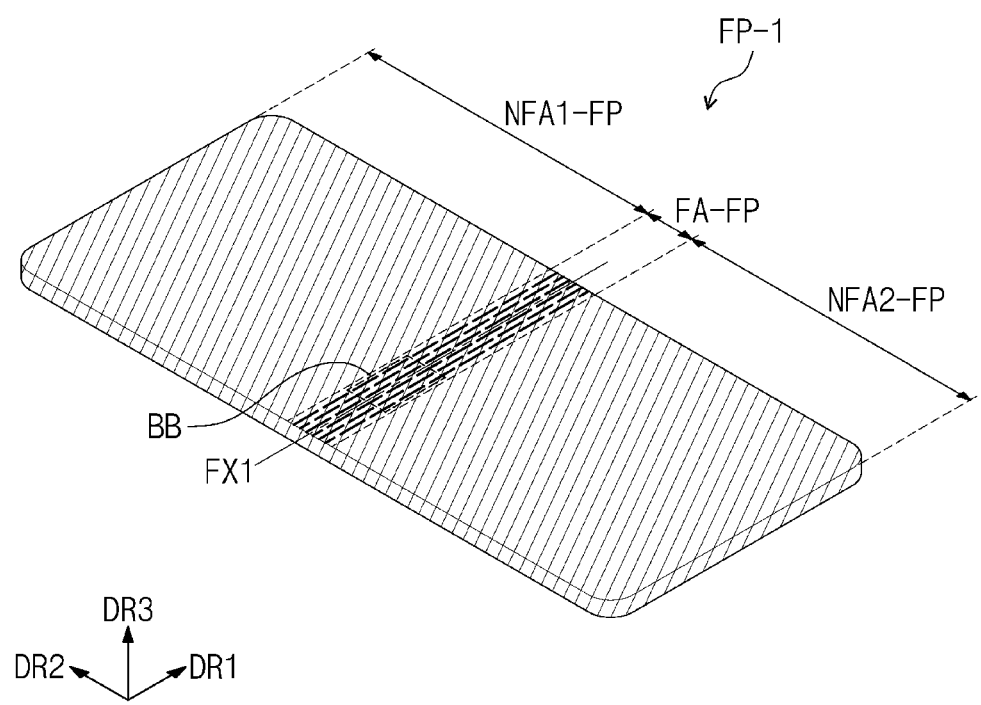
FIG. 10 is a schematic perspective view of a support plate according to an embodiment of the disclosure.
Figure 11:
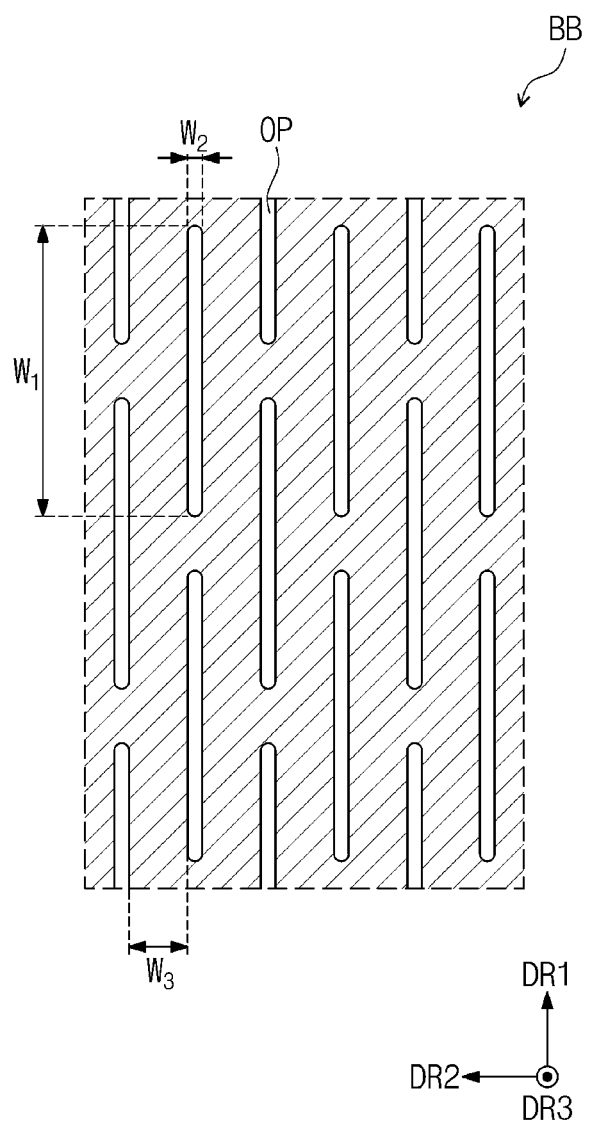
FIG. 11 is a plan view schematically illustrating area BB of the support plate according to an embodiment.

FIG. 9 is a schematic cross-sectional view illustrating an electronic device according to an embodiment. FIG. 10 is a schematic perspective view of a support plate according to an embodiment. FIG. 11 is a schematic plan view illustrating area BB of the support plate according to an embodiment.

An electronic device ED-1 according to an embodiment may include a display module DM and a support plate FP-1 disposed under the display module DM. Openings OP may be defined in the support plate FP-1.

The support plate FP-1 may include a plate folding part FA-FP and plate non-folding parts NFA1-FP and NFA2-FP. A first plate non-folding part NFA1-FP and a second plate non-folding part NFA2-FP may be spaced apart from each other in the second direction DR2 with the plate folding part FA-FP therebetween.

The plate folding part FA-FP may be a portion corresponding to a folding area FA1, and the plate non-folding parts NFA1-FP and NFA2-FP may be portions corresponding to non-folding areas NFA1 and NFA2. The plate folding part FA-FP may be a portion overlapping a folding display part FA-D (see FIG. 3), and the plate non-folding parts NFA1-FP and NFA2-FP are portions overlapping non-folding display parts NFA1-D and NFA2-D (see FIG. 3).

Openings OP may be defined in the plate folding part FA-FP. In a plan view defined by the first and second direction DR1 and DR2, a width $W_1$ of each of the openings OP in the first direction DR1 may be greater than that $W_2$ of each of the opening OP in the second direction DR2. The width $W_1$ of the opening OP in the first direction DR1 parallel to the extending direction of the folding axis FX1 may be greater than that $W_2$ of the opening OP in the second direction DR2 perpendicular to the extending direction of the folding axis FX1.

Although not shown in the drawings, the support plate FP-1 of FIG. 10 according to an embodiment may include reinforced fibers extending in the direction of the first direction DR1. Long axes of the reinforced fibers may be parallel to an extension direction of a folding axis FX1, which is the direction of the first direction DR1. For example, the support plate FP-1 according to an embodiment may be a longitudinal sub-support plate in which the folding axis FX1 and the long-axis direction of the reinforced fibers are parallel to each other.

Even in case that the opening OP is defined in the support plate FP-1 according to an embodiment, the reinforced fibers included in the longitudinal sub-support plate may not be cut, but may be remained in a state extending in a direction so that mechanical properties such as the modulus may be maintained.

FIG. 11 is a schematic enlarged view illustrating a portion of the support plate in which openings OP are defined. The support plate FP-1 according to an embodiment may be made of a reinforced fiber composite and thus may be easily patterned in shape of the opening when compared to a support plate made of a metal material.

Table 2 below illustrates results obtained by comparing the physical properties of the support plate in case that a width $W_2$ of an opening and an interval $W_3$ between the openings are different. The width $W_2$ of the opening may correspond to a width of a hole portion, as a portion that is removed after the opening is processed, and the interval $W_3$ may correspond to a width of a rib portion remaining after the opening is processed.

Table 2 shows results obtained by comparing a case of processing stainless steel (SUS) to processed carbon fiber reinforced plastic (CFRP). Both the SUS and the CFRP correspond to a case in which each of the SUS and the CFRP is provided as a single layer and has a thickness of about 0.15 mm.

TABLE 2

| Classification | | SUS | CFRP | | | |
| --- | --- | --- | --- | --- | --- | --- |
| | | | CFRP-1 | CFRP-2 | CFRP-3 | CFRP-4 |
| Processing Characteristics | $W_2/W_3$ (μm/μm) | 150/100 | 150/100 | 90/60 | 60/40 | 50/100 |
| | Porosity (%) | 60 | 58 | 63 | 65 | 36 |
| | Number of openings | 385 | 385 | 638 | 957 | 638 |
| Machine property | Tensile strength [MPa] | 3.03 | 3.4 | 0.45 | 0.20 | 0.30 |
| | Young's modulus [GPa] | 0.37 | 0.41 | 0.04 | 0.02 | 0.21 |
| | Yield strain [%] | 91 | 200 | 246 | 264 | 356 |

Referring to CFRP-1 to CFRP-4 in Table 2, a support plate including a reinforced fiber composite such as carbon-reinforced fiber plastic may be processed while the number of openings and a size of each of the openings may be changed. For example, the support plate including the reinforced fiber composite may be processed by easily changing the size of each of the openings and the number of openings according to required physical properties.

It can be seen that the SUS and the CFRP-1 have similar properties in tensile strength and Young's modulus by comparing the mechanical properties of the SUS and the CFRP-1, which are processed in the same opening shape. Also, it is seen that the CFRP-1 has improved mechanical properties because plastic deformation is not easy because of the high yield strain value when compared to the SUS.

Table 3 below shows results obtained by comparing crease deformation and repulsive force of samples evaluated in Table 2. The crease deformation corresponds to the measurement in difference between the maximum and minimum heights of a creased portion in case that the electronic device is unfolded after the folded state is maintained for about 24 hours. The repulsive force was measured as force acting in the unfolding direction after the electronic device is folded based on the folding axis.

TABLE 3

| Classification | SUS | CFRP | | | |
| --- | --- | --- | --- | --- | --- |
| | | CFRP-1 | CFRP-2 | CFRP-3 | CFRP-4 |
| Processing characteristics $W_2/W_3$ (μm/μm) | 150/100 | 150/100 | 90/60 | 60/40 | 50/100 |
| Strain [μm] | 48.4 | 36.1 | 34.5 | 34.9 | 31.2 |
| Repulsive force [N] | 0.85 | 0.85 | 0.85 | 0.82 | 0.83 |

Referring to Table 3, it can be seen that the strain of the CFRP is less than that of the SUS, and also, desirable outer appearance quality is realized in case that the support plate includes the reinforced fiber composite. Also, the repulsive force had a value similar to that of the SUS. Therefore, in the case of the electronic device according to an embodiment, which includes the support plate including the reinforced fiber composite, the electronic device may have the improved appearance quality while having desirable folding characteristics.

A folding reliability evaluation was performed at a temperature of about −20° C. for the electronic device including the support plate made of the CFRP. It was confirmed that the reliability is desirable in case that a folding operation is repeated 30,000 times at a temperature of about −20° C. for the electronic device including the support plate including the CFRP.

For example, in case that considering the results of Tables 2 and 3 and the reliability evaluation results, which are described above, it can be seen that the electronic device including the support plate including the reinforced fibers according to an embodiment has the excellent folding characteristics and the improved mechanical properties and also has the desirable reliability.

Figure 12:
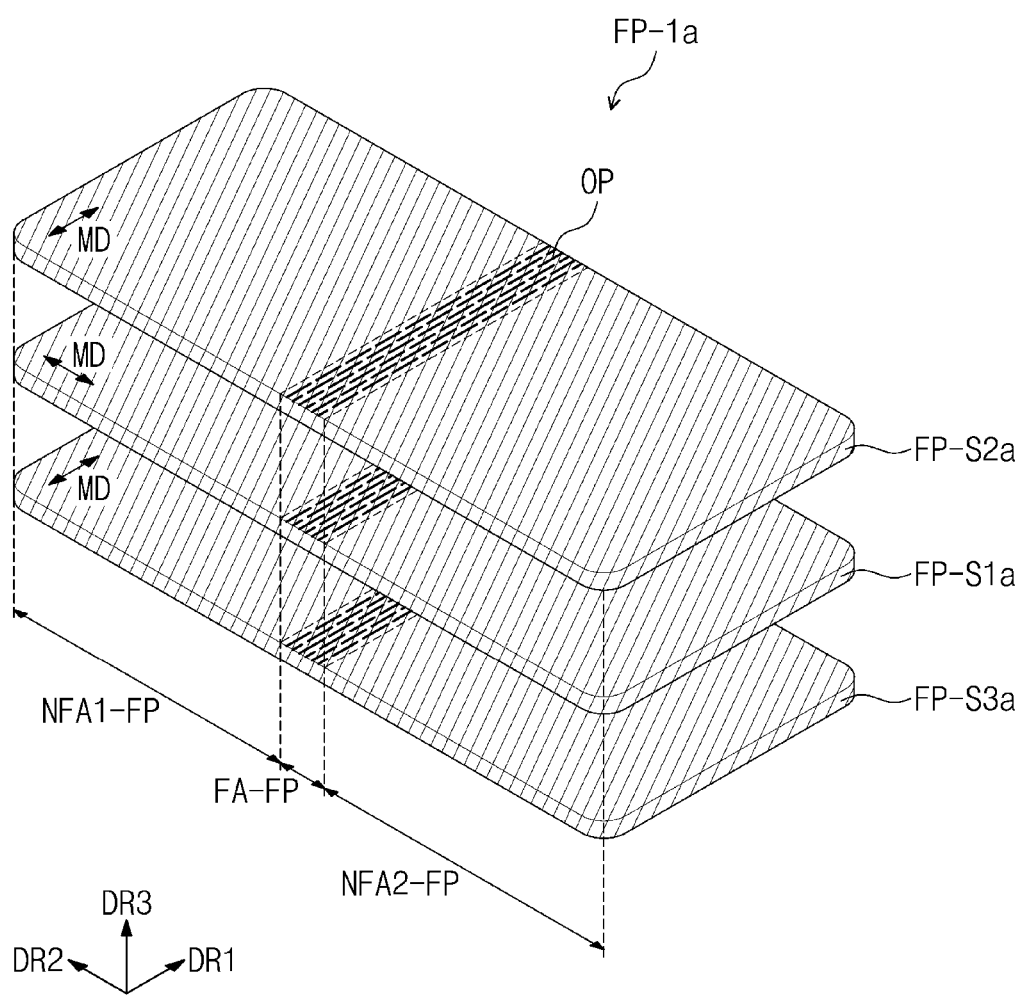
FIG. 12 is a schematic exploded perspective view of a support plate according to an embodiment of the disclosure.
Figure 13:
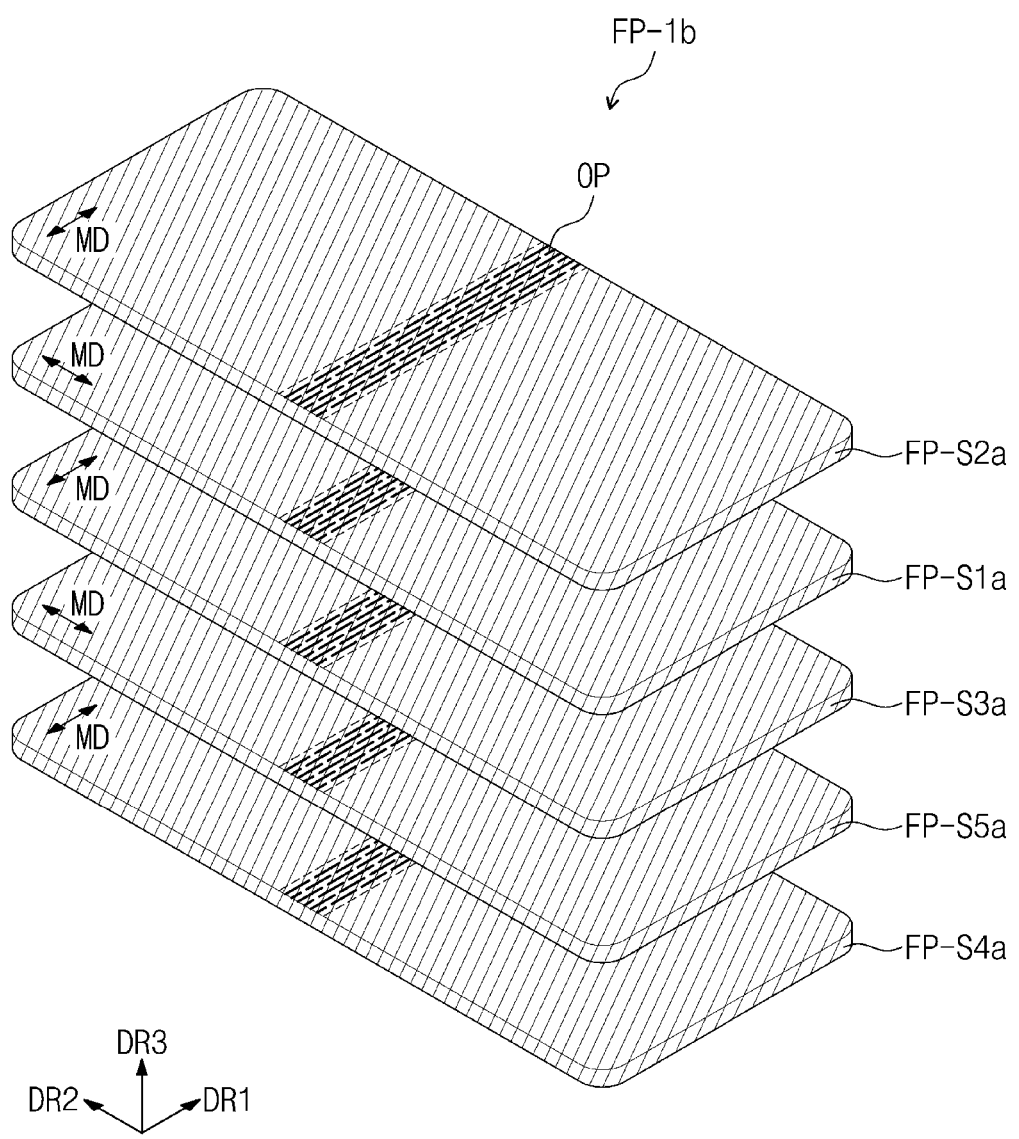
FIG. 13 is a schematic exploded perspective view of a support plate according to an embodiment of the disclosure.

FIGS. 12 and 13 are schematic exploded perspective views of a support plate according to an embodiment.

Referring to FIG. 12, a support plate FP-1a according to an embodiment may include laminated sub-support plates FP-S1a, FP-S2a, and FP-S3a. The support plate FP-1a may include a reinforced fiber composite including reinforced fibers extending in a direction, as described above. Each of the sub-support plates FP-S1a, FP-S2a, and FP-S3a may include the reinforced fiber composite including the reinforced fibers extending in a direction.

The support plate FP-1a according to an embodiment may include a first sub-support plate FP-S1a including reinforced fibers, long axes of which are arranged parallel to the second direction DR2, a second sub-support plate FP-S2a disposed above the first sub-support plate FP-S1a and including reinforced fibers, long axes of which are parallel to the first direction DR1, and a third sub-support plate FP-S3a disposed under the first-support plate FP-S1a and including reinforced fibers, long axes of which are parallel to the first direction DR1. In the support plate FP-1a, the second sub-support plate FP-S2a may be disposed between the first sub-support plate FP-S1a and the display module DM (see FIG. 9), and the third sub-support plate FP-S3a may be disposed between the first sub-support plate FP-S1a and the support member SM.

The support plate FP-1a according to an embodiment may include sub-support plates in which a longitudinal sub-support plate, a transverse sub-support plate, and a longitudinal sub-support plate are sequentially laminated. For example, in the support plate FP-1a according to an embodiment, each of the second sub-support plate FP-S2a, which is the uppermost layer, and the third sub-support plate FP-S3a, which is the lowermost layer, may include the reinforced fibers aligned in the first direction parallel to the folding axis. Also, the support plate FP-1a according to an embodiment may include the first sub-support plate FP-S1a including the reinforced fibers aligned in the second direction DR2 perpendicular to the folding axis between the second sub-support plate FP-S2a, which is the uppermost layer, and the third sub-support plate FP-S3a, which is the lowermost layer.

The support plate FP-1a may include a plate folding part FA-FP and a plate non-folding part NFA1-FP and NFA2-FP, and openings OP may be defined in the plate folding part FA-FP. The openings OP may be defined in the first to third sub-support plates FP-S1a, FP-S2a, and FP-S3a, respectively. The openings OP may be defined in the first to third sub-support plates FP-S1a, FP-S2a, and FP-S3a corresponding to the plate folding part FA-FP, respectively.

Referring to FIG. 13, a support plate FP-1b according to an embodiment may further include a fourth sub-support plate FP-S4a and a fifth sub-support plate FP-S5a when compared to the support plate FP-1a of FIG. 12 according to an embodiment.

The support plate FP-1b according to an embodiment may include a first sub-support plate FP-S1a including reinforced fibers, long axes of which are arranged parallel to the second direction DR2, a second sub-support plate FP-S2a disposed above the first sub-support plate FP-S1a and including reinforced fibers, long axes of which are parallel to the first direction DR1, and a third sub-support plate FP-S3a disposed under the first sub-support plate FP-S1a and including reinforced fibers, long axes of which are parallel to the first direction DR1. Also, the support plate FP-1b according to an embodiment may include a fourth sub-support plate FP-S4a disposed under the third sub-support plate FP-S3a and including reinforced fibers, long axes of which are arranged parallel to the first direction DR1 and a fifth sub-support plate FP-S5a disposed between the third sub-support plate FP-S3a and the fourth sub-support plate FP-S4a and including reinforced fibers, long axes of which are parallel to the second direction DR2. In the support plate FP-1b according to an embodiment, the fourth sub-support plate FP-S4a may be disposed adjacent to the support member SM (see FIG. 9).

The support plate FP-1b according to an embodiment may include sub-support plates in which a longitudinal sub-support plate, a transverse sub-support plate, and a longitudinal sub-support plate are sequentially laminated. For example, in the support plate FP-1b according to an embodiment, each of the second sub-support plate FP-S2a, which is the uppermost layer, and the fourth sub-support plate FP-S4a, which is the lowermost layer, may include the reinforced fibers aligned in the first direction parallel to the folding axis. Also, the support plate FP-1b according to an embodiment may include the first sub-support plate FP-S1a and the fifth sub-support plate FP-S5a, which include the reinforced fibers aligned in the second direction DR2 perpendicular to the folding axis between the second sub-support plate FP-S2a, which is the uppermost layer, and the fourth sub-support plate FP-S4a, which is the lowermost layer.

The openings OP may be defined in the first to third sub-support plates FP-S1a, FP-S2a, and FP-S3a, respectively. The openings OP may be defined in the first to fifth sub-support plates FP-S1a, FP-S2a, and FP-S5a corresponding to the plate folding part FA-FP, respectively.

In the case of the support plates FP-1a and FP-1b, each of which includes the longitudinal sub-support plate and the transverse sub-support plate as illustrated in FIGS. 12 and 13, according to an embodiment, even in case that the opening is defined in the support plate, the reinforcing fibers included in the longitudinal sub-support plate may not be cut, but may be maintained in the state extending in a direction so that mechanical properties such as the modulus are maintained. For example, in an embodiment, the reinforced fibers included in the transverse sub-support plate may be partially cut in the openings to reduce strength in the direction perpendicular to the folding axis, but the longitudinal sub-support plates respectively disposed at the upper and lower sides of the transverse sub-support plate may include the reinforced fibers extending in the folding direction to maintain desirable mechanical properties.

Figure 14:
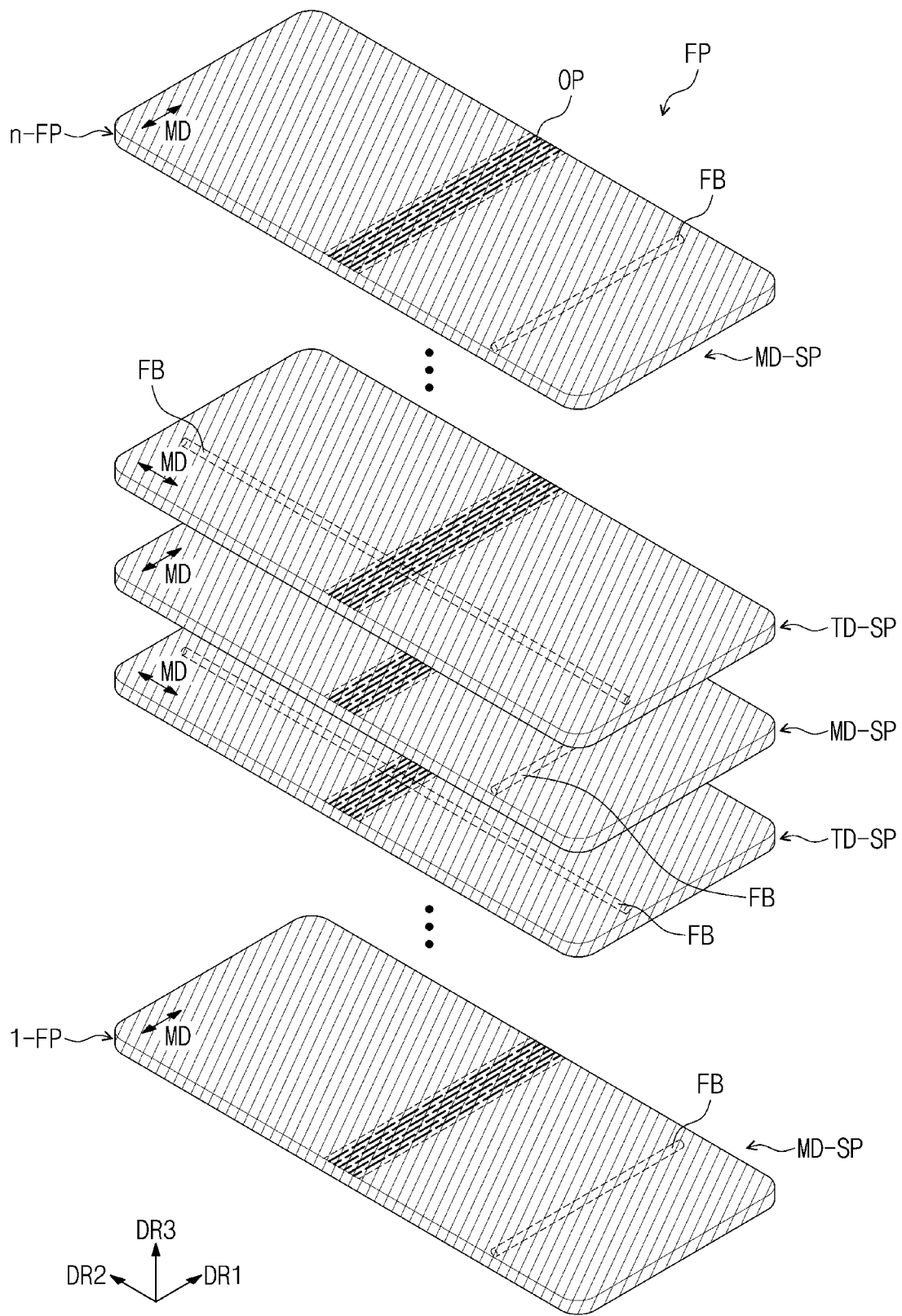
FIG. 14 is a schematic exploded perspective view of a support plate according to an embodiment of the disclosure.

FIG. 14 is a schematic perspective view of a support plate FP according to an embodiment. The support plate FP according to an embodiment may include n sub-support plates sequentially laminated in the direction of the display module DM (see FIG. 9), where n is a natural number. The n sub-support plates may include a longitudinal sub-support plate MD-SP and a transverse sub-support plate TD-SP, which are alternately laminated. In the longitudinal sub-support plate MD-SP, the long axes of the reinforced fibers FB may be arranged in the first direction DR1, and in the transverse sub-support plate TD-SP, the long axes of the reinforced fibers FB may be arranged in the second directions DR2.

In the support plate FP according to an embodiment, both a first sub-support plate 1-FP and an n-th sub-support plate n-FP may be the longitudinal sub-support plates MD-SP. For example, in the case of the support plate FP including both the longitudinal sub-support plate MD-SP and the transverse sub-support plate TD-SP, each of the uppermost and lowermost sub-support plates may be provided as the longitudinal sub-support plate. Therefore, even in case that the openings OP are defined therein, the mechanical strength may be maintained at an outermost side to maintain the desirable mechanical strength and modulus of the entire support plate FP. In an embodiment, the n-th sub-support plate n-FP may be adjacent to the display module DM (see FIG. 9), and the first sub-support plate 1-FP may be adjacent to the support member SM.

In case that the support plate FP according to an embodiment includes n sub-support plates, n may be an integer of 3 or more. Among the n sub-support plates, each of both the first sub-support plate 1-FP and the n-th sub-support plate n-FP may be the longitudinal sub-support plate MD-SP, and at least one of a second sub-support plate 2-FP or an (n−1)-th sub-support plate may be the transverse sub-support plate TD-SP. For example, the support plate FP according to an embodiment may include the uppermost and lowermost sub-support plates as the longitudinal sub-support plates to maintain the mechanical strength and may include at least one transverse sub-support plate TD-SP therebetween to improve the strength when the folding or bending.

The contents of the electronic device according to an embodiment described with reference to FIGS. 3 and 14 have been described with reference to the electronic device illustrated in FIGS. 1A and 1B according to an embodiment, but the embodiment is not limited thereto. The contents of the electronic device according to an embodiment described with reference to FIGS. 3 and 14 may be equally applied to the electronic device ED-a according to an embodiment described with reference to FIGS. 2A to 2D. For example, even in case that the folding axis FX2 is parallel to the direction of the long side of the electronic device ED-a, the above-described support plate may be equally applied.

The electronic device according to an embodiment may be disposed under the display module and include the support plate including the reinforced fibers to reduce the weight of the electronic device. The support plate according to an embodiment may include the reinforced fiber composite including the reinforced fibers to improve workability such as forming an opening pattern when compared to the metal plate.

The electronic device according to an embodiment may include the longitudinal sub-support plate including the reinforced fibers of which the long axes are aligned in parallel to the folding axis direction and the transverse sub-support plate including the reinforced fibers of which the long axes are aligned in the direction perpendicular to the folding axis to realize the flexibility in the folding area and the desirable mechanical properties and strength in the folding axis direction, thereby realizing the desirable mechanical strength and folding characteristics.

The electronic device according to the embodiment of the disclosure may include the support plate including the reinforced fibers aligned in a direction to realize the desirable flexibility and mechanical properties in the folding area while having the light weight.

It will be apparent to those skilled in the art that various modifications and deviations can be made in the disclosure. Thus, it is intended that the disclosure covers the modifications and deviations of this disclosure provided they come within the scope of the appended claims and their equivalents.

Accordingly, the technical scope of the claimed invention should not be limited to the contents described in the detailed description of the specification, but should be determined by the claims.

What is claimed is:

1. An electronic device comprising:
a display module; and
a support plate disposed under the display module and comprising a plurality of reinforced fibers that have long axes,
wherein the electronic device includes:
a folding area foldable with respect to a folding axis extending in a first direction, and
a non-folding area adjacent to the folding area, wherein all of the long axes of the plurality of reinforced fibers are parallel to the first direction.

2. The electronic device of claim 1, wherein the reinforced fibers comprise carbon fibers or glass fibers.

3. The electronic device of claim 1, wherein
the support plate comprises a matrix part, the matrix part comprising a thermoplastic resin, and
the reinforced fibers are dispersed in the matrix part.

4. The electronic device of claim 1, wherein
the support plate comprises a first sub-support plate and a second sub-support plate, which are laminated in a thickness direction of the electronic device when the electronic device is in an unfolded state,
the first sub-support plate comprises first reinforced fibers having long axes perpendicular to the folding axis, and
the second sub-support plate comprises second reinforced fibers having long axes parallel to the folding axis.

5. An electronic device comprising:
a display module; and
a support plate disposed under the display module and comprising a plurality of reinforced fibers that have long axes parallel to a direction,
wherein the electronic device includes:
a folding area foldable with respect to a folding axis extending in the direction, and
a non-folding area adjacent to the folding area, wherein
the support plate comprises three or more sub-support plates that are laminated in a thickness direction of the electronic device, and
in the sub-support plates that are laminated, each of an uppermost sub-support plate of the three or more sub-support plates that is adjacent to the display module and a lowermost sub-support plate of the three or more sub-support plates that is spaced apart from the display module comprises reinforced fibers having long axes parallel to the direction.

6. The electronic device of claim 5, wherein the support plate comprises at least one transverse sub-support plate disposed between the uppermost sub-support plate and the lowermost sub-support plate, the at least one transverse sub-support plate comprising reinforced fibers that have long axes perpendicular to the direction.

7. The electronic device of claim 1, wherein
the support plate comprises n sub-support plates that are sequentially laminated in a direction of the display module,
the n sub-support plates comprise a longitudinal sub-support plate and a transverse sub-support plate, which are alternately laminated,
the longitudinal sub-support plate comprises reinforced fibers having long axes arranged in the first direction,
the transverse sub-support plate comprises reinforced fibers having long axes arranged in a second direction perpendicular to the first direction, and
each of an n-th sub-support plate adjacent to the display module and a first sub-support plate spaced apart from the display module are provided as the longitudinal sub-support plate,
where the n is an odd number of 3 or more.

8. The electronic device of claim 1, wherein
the display module comprises:
a folding display part corresponding to the folding area; and
a first non-folding display part and a second non-folding display part corresponding to the non-folding area and spaced apart from each other with the folding display part disposed between the first and second non-folding display parts, and
the support plate comprises:
a first plate overlapping the first non-folding display part; and
a second plate overlapping the second non-folding display parts and spaced apart from the first plate.

9. An electronic device comprising:
a display module; and
a support plate disposed under the display module and comprising a plurality of reinforced fibers that have long axes,
wherein the electronic device includes:
a folding area foldable with respect to a folding axis extending in a first direction, and
a non-folding area adjacent to the folding area,
the support plate comprises:
a plate folding part corresponding to the folding area; and
a plate non-folding part corresponding to the non-folding area, and
a plurality of openings are formed in the plate folding part, and
wherein all of the long axes of the plurality of reinforced fibers are parallel to the first direction.

10. The electronic device of claim 9, wherein a width of each of the plurality of openings in a direction parallel to the first direction is greater than a width of each of the plurality of openings in another direction perpendicular to the first direction.

11. The electronic device of claim 1, further comprising:
a support member disposed under the support plate, the support member comprising at least one of a support layer and a cushion layer.

12. The electronic device of claim 11, wherein the support layer comprises a metal material or a reinforced fiber composite.

13. The electronic device of claim 11, wherein the cushion layer comprises at least one of an acrylic-based polymer, a urethane-based polymer, a silicon-based polymer, and an imide-based polymer.

14. The electronic device of claim 1, further comprising a protective layer disposed between the display module and the support plate, the protective layer comprising a polyimide film or a polyethylene terephthalate film.

15. An electronic device comprising:
a display module comprising:

a folding display part foldable with respect to a folding axis extending in a first direction; and a first non-folding display part and a second non-folding display part spaced apart from each other in a second direction perpendicular to the first direction with the folding display part disposed between the first and second non-folding display parts; and a support plate disposed under the display module and comprising reinforced fibers aligned in a direction, wherein the support plate comprises:

a first sub-support plate comprising reinforced fibers that have long axes arranged in the second direction;

a second sub-support plate disposed between the first sub-support plate and the display module, the second sub-support plate comprising reinforced fibers that have long axes parallel to the first direction; and a third sub-support plate disposed under the first sub-support plate and comprising reinforced fibers that have long axes parallel to the first direction.

16. The electronic device of claim 15, wherein the support plate comprises:

a fourth sub-support plate disposed under the third sub-support plate and comprising reinforced fibers that have long axes parallel to the first direction; and a fifth sub-support plate disposed between the third sub-support plate and the fourth sub-support plate, the fifth sub-support plate comprising reinforced fibers that have long axes parallel to the second direction.

17. The electronic device of claim 15, wherein the folding axis extends parallel to a short side of the display module or extends parallel to a long side of the display module.

18. The electronic device of claim 15, wherein the support plate comprises a plate folding part in which a plurality of openings are formed, and the plate folding part overlaps the folding display part.

19. The electronic device of claim 18, wherein a width of each of the plurality of openings in the first direction is greater than a width of each of the plurality of openings in the second direction.

20. The electronic device of claim 15, wherein a plurality of openings are formed in each of the first to third sub-support plates to correspond to the folding display part.

21. The electronic device of claim 1, further comprising an adhesive layer directly disposed on a main surface of the support plate.

* * * * *